US006813282B1

United States Patent
Domon

(10) Patent No.: US 6,813,282 B1
(45) Date of Patent: Nov. 2, 2004

(54) ISOCHRONOUS PACKET TRANSFER METHOD, COMPUTER READABLE RECORDING MEDIA RECORDED WITH CONTROL PROGRAM FOR EXECUTING ISOCHRONOUS PACKET TRANSFER, AND BRIDGE AND PACKET TRANSFER CONTROL LSI

(75) Inventor: Wataru Domon, Tokyo (JP)

(73) Assignee: NEC Corporation (JP)

( * ) Notice: Subject to any disclaimer, the term of this patent is extended or adjusted under 35 U.S.C. 154(b) by 793 days.

(21) Appl. No.: 09/665,262

(22) Filed: Sep. 19, 2000

(30) Foreign Application Priority Data

Sep. 24, 1999 (JP) .......................................... 11-271388

(51) Int. Cl.[7] ................................................. H04J 3/06
(52) U.S. Cl. ...................... 370/516; 370/252; 370/230
(58) Field of Search ............................... 370/229, 230, 370/252, 503, 516

(56) References Cited

U.S. PATENT DOCUMENTS

| 3,975,593 | A | * | 8/1976 | Fick | ........................... 370/538 |
| 5,467,342 | A | * | 11/1995 | Logston et al. | ............. 370/253 |
| 5,544,324 | A | * | 8/1996 | Edem et al. | ................. 709/231 |
| 5,742,586 | A | * | 4/1998 | Murakami et al. | ........... 370/230 |
| 5,822,317 | A | * | 10/1998 | Shibata | ................... 370/395.62 |
| 6,418,150 | B1 | * | 7/2002 | Staats | .......................... 370/503 |

FOREIGN PATENT DOCUMENTS

| EP | 873019 A2 * | 10/1998 | .......... H04N/07/52 |
| EP | 0-942556 | 9/1999 | |
| JP | 11-177591 | 7/1999 | |
| WO | WO-99-35587 | 7/1999 | |
| WO | WO 9959047 A2 * | 11/1999 | |

OTHER PUBLICATIONS

IEEE Standard for High Performance Serial Bus. IEEE Std 1394, Dec. 1995. pp. 167–174.*
Santamaria, R. "IEEE–1394: A Standard for the Next Millenium". Digital Avionics Systems Conference. Oct. 24–29, 1999, vol. 1. pp. 1.C.2–1–1.C.2–7.*

Korean Office Action dated Apr. 25, 2002.

Difu Su, et al., "Investigating factors influencing QoS of Internet phone," Multimedia Computing and Systems, IEEE International Conference, Published 1999, vol. 1 pp. 308–313.

C.E. Bagwell, et al. "ATM cell delay and loss for best–effort TCP in the presence of isochronous traffic," INFOCOM'94 Networking for Global Communications, 13th Proceedings IEEE, Published 1994, vol. 3, pp. 1141–1149.

European Search Reported dated Jun. 19, 2002.

\* cited by examiner

*Primary Examiner*—John Pezzlo
*Assistant Examiner*—Donald L Mills
(74) *Attorney, Agent, or Firm*—Dickstein, Shapiro, Morin & Oshinsky, LLP.

(57) ABSTRACT

An isochronous packet transfer method is provided which can reduce a transmit buffer size required for isochronous packet transfer, and which can give a constant delay to an isochronous packet even if transmission of a cycle start packet is delayed. An isochronous packet received from an input side bus is input to a delay section, and this isochronous packet is delayed in accordance with delay information and is transmitted to an output side bus. Input side and output side cycle identification information generating sections respectively output cycle identification information which changes at a timing at which a cycle start packet is sent to the input side bus and the output side bus. Input side and output side reference cycle identification information generating sections sample the input side and output side cycle identification information at predetermined timing and output input side and output side reference cycle identification information. A delay information generating section adds a fixed delay to a difference in the elapsed cycle number for each bus from the predetermined timing, based on input side and output side cycle identification information and input side and output side reference cycle identification information to generate delay information.

26 Claims, 19 Drawing Sheets

| 00 | phy_ID | R | T | gap_cnt | 0000 | 0000 | 0000 | 0000 |
|----|--------|---|---|---------|------|------|------|------|
| logical inverse of first quadlet ||||||||||

Input format to packet reception
cycle identification information
attachment section 154

Output format from packet reception
cycle identification information
attachment section 154

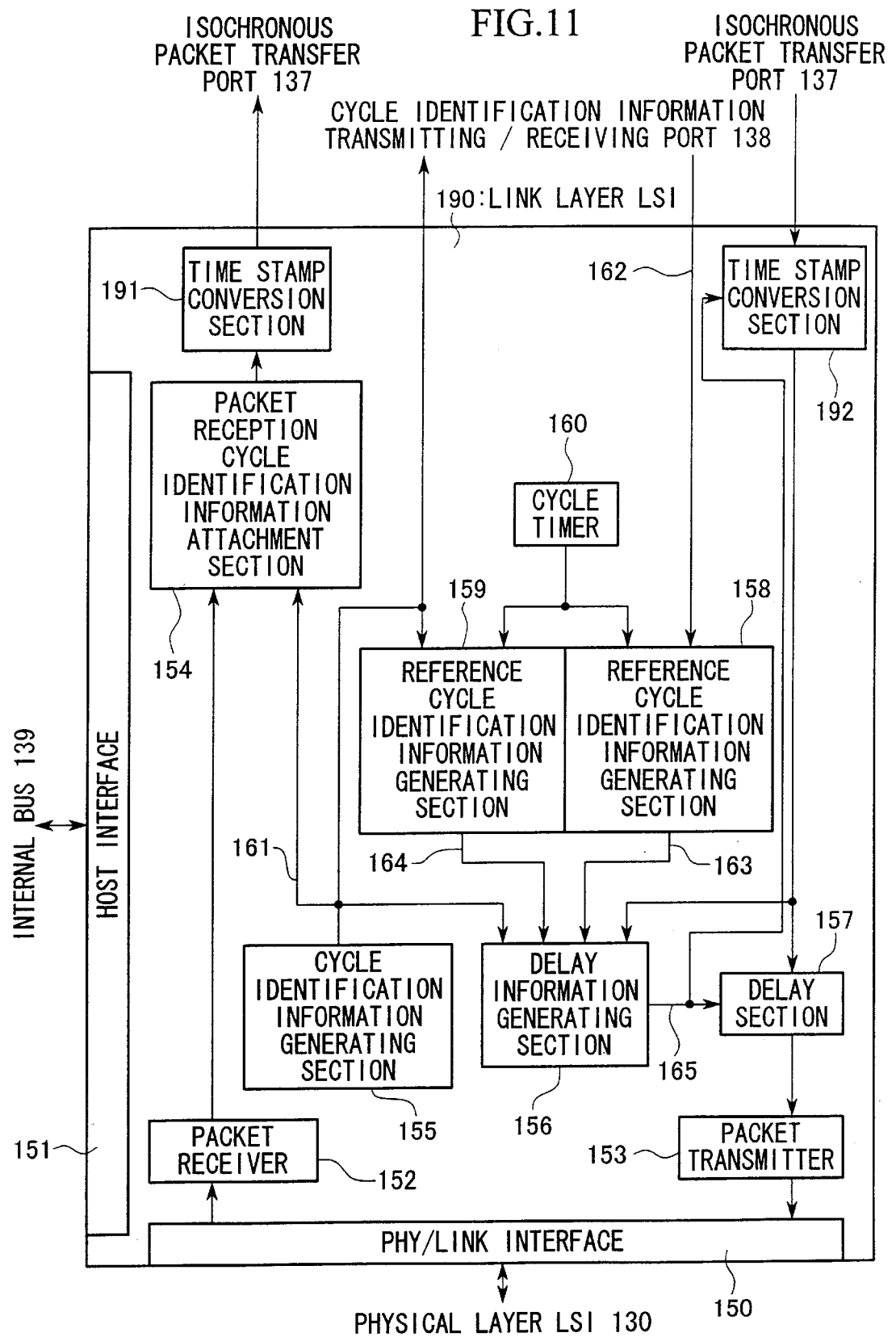

CIP header with time stamp field

Source packet header with time stamp field

C1: portal #1 cycle identification information
Cr1: portal #1 reference cycle identification information
C2: portal #2 cycle identification information
Cr2: portal #2 reference cycle identification information
Df: fixed delay (=2 cycles)
D: delay amount \* cycle identification information generating counter is 3 bit counter (value 0-7 range)

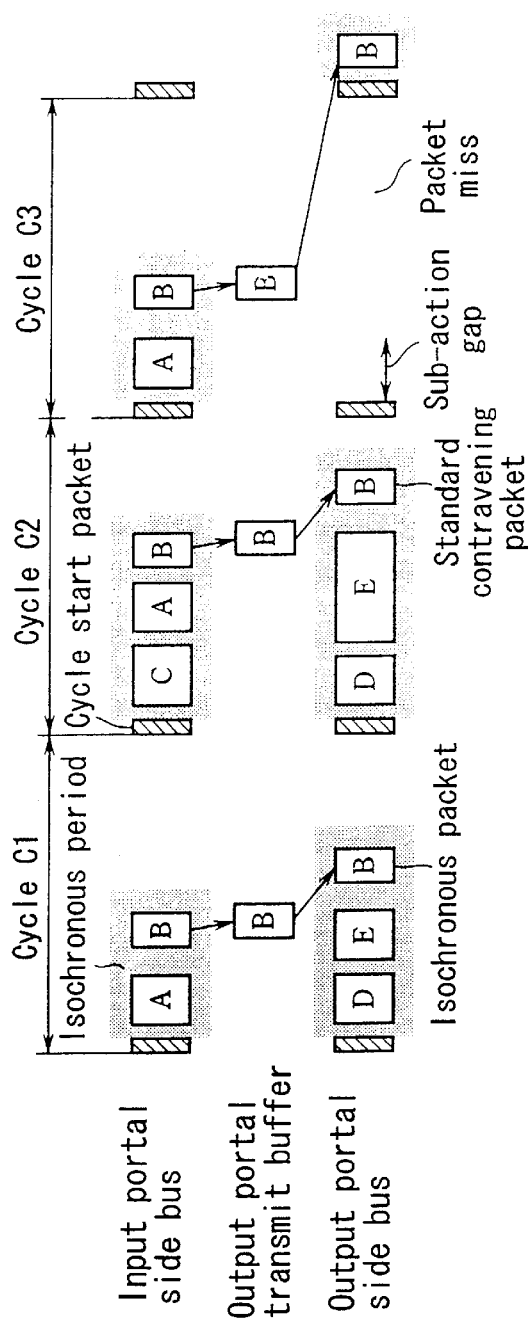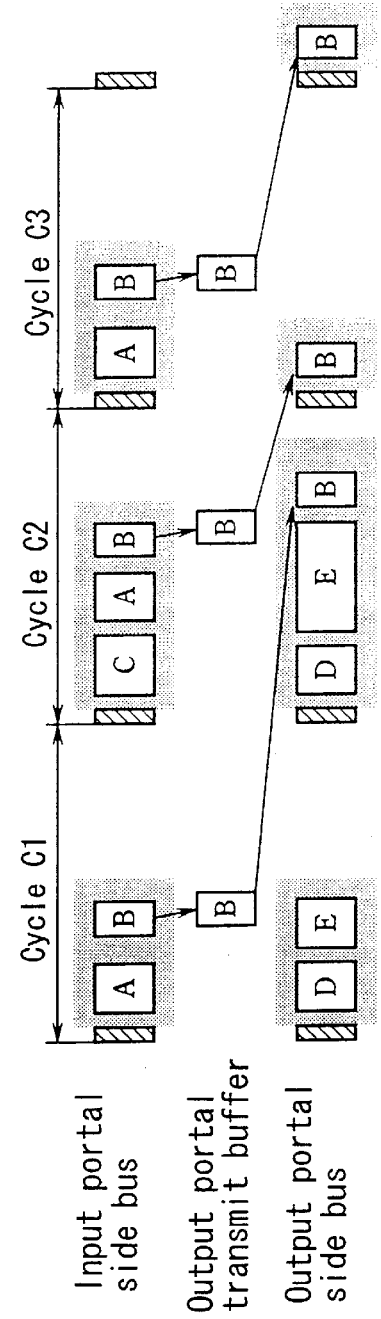

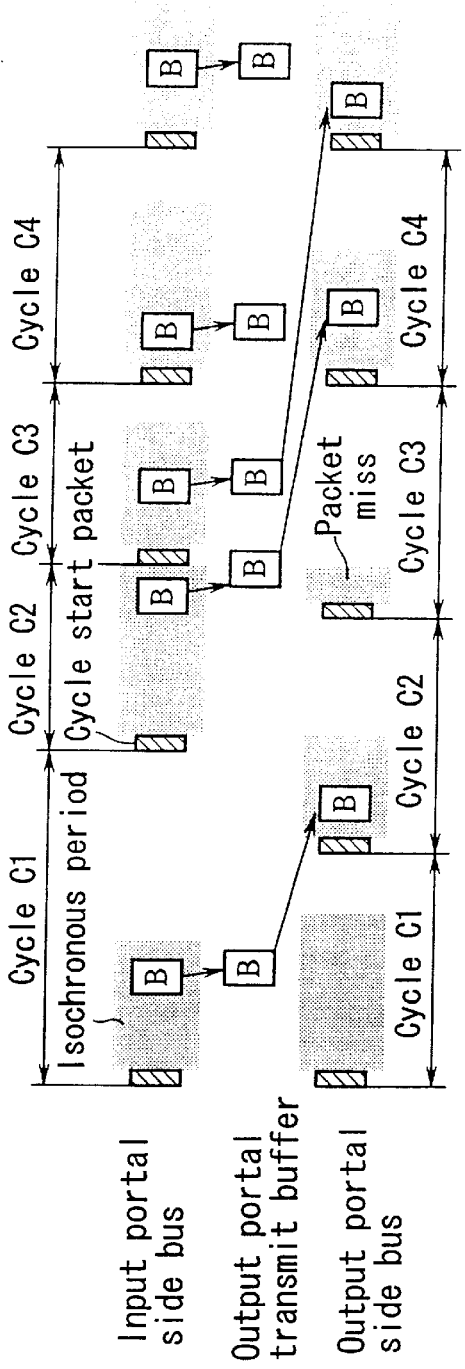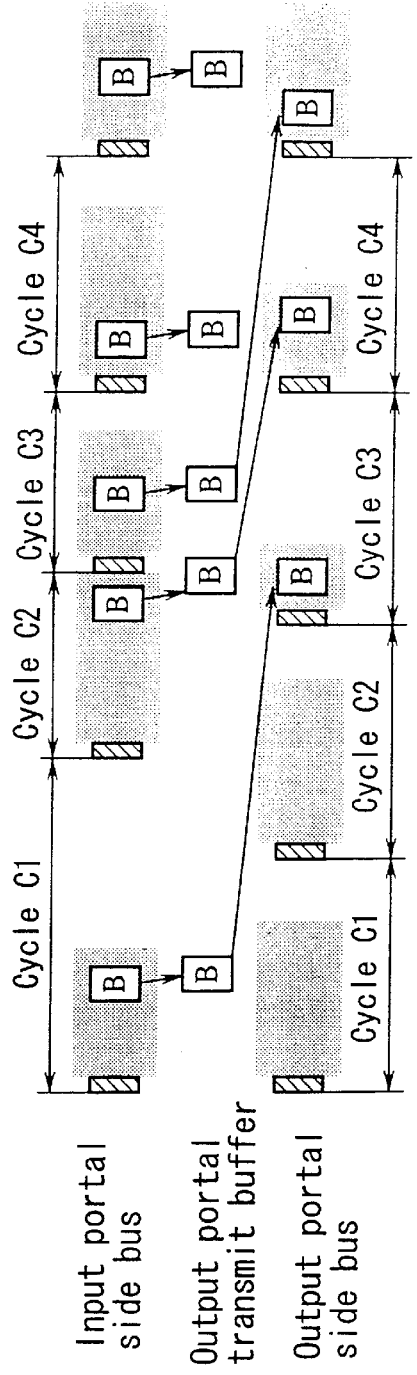

ISOCHRONOUS PACKET TRANSFER METHOD, COMPUTER READABLE RECORDING MEDIA RECORDED WITH CONTROL PROGRAM FOR EXECUTING ISOCHRONOUS PACKET TRANSFER, AND BRIDGE AND PACKET TRANSFER CONTROL LSI

BACKGROUND OF THE INVENTION

1. Field of the Invention

The present invention relates to an isochronous packet transfer method for transferring a packet for which the transfer band has been previously secured, on a communications network which uses a bus conforming to the specifications of IEEE (Institute of Electrical and Electronic Engineers) standard 1394 or USB (Universal Serial Bus). Furthermore, the present invention relates to a recording medium on which is stored an isochronous packet transfer control program serving as a means for executing the isochronous packet transfer method, a bridge, and a packet transfer control LSI (Large Scale Integrated Circuit).

This application is based on Japanese Patent Application No. Hei 11-271388, the contents of which are incorporated herein by reference.

2. Description of the Related Art

Recently, as a high performance serial bus standard having high speed transmission capability of for example 100 megabit per second (S100), 200 megabit per second (S200), or 400 megabit per second (S400), attention is being given to IEEE 1394 standard ("IEEE-Std. 1394-1995, IEEE Standard for a High Performance Serial Bus", abbreviated hereunder to "1394 standard"). In the 1394 standard, in order to transfer data in a real time system such as with images or voice where there is a problem if there is an interruption during playback, an "isochronous transfer mode" for securing the packet transfer band is stipulated. This isochronous transfer mode is realized by a concept for a "cycle" nominally having a frequency of 8 kilohertz (a 125 microsecond period), and introducing a procedure for previously acquiring a time where packet transfer is possible for each cycle. Hereunder, a packet which is transferred by the isochronous transfer mode is referred to as an "isochronous packet".

In order to understand the problems with the conventional technology, since knowledge of the 1394 standard is necessary, this will be described below in somewhat lengthy detail. At first is an explanation with reference to FIG. 17 of a specific method which is prescribed by 1394 standard in order to supervise a cycle. Of a number of 1394 standard nodes (referred to hereunder simply as a "nodes") connected to a bus, a node referred to as a cycle master is defined. Then the respective nodes connected to a bus detect a packet referred to as a "cycle start packet" multicast from the cycle master, to thereby recognize cycle start. Furthermore, both the nodes and the cycle master for sending and receiving the isochronous packet are installed in a CYCLE_TIME register for storing time information. The cycle master uses this CYCLE_TIME register to keep the transmission period for the cycle start packet constant.

Here, FIG. 18 shows the format of the CYCLE_TIME register specified by 1394 standard. As shown in the figure, the CYCLE_TIME register is a 32 bit width register, with the 7 bits from the most significant bit referred to as a second_count field, then the next 13 bits referred to as a cycle_count field, and the 12 bits to the least significant bit referred to as a cycle_offset field. Of these, the cycle_offset field is a counter of 3072 (decimal number) scale which counts up with a clock of a nominal value of 24.576 megahertz, and after counting to "3071" (decimal number), returns to "0". That is to say, with the count value of this counter, the value returns to "0" for each 125 microseconds, being the period of the cycle. Hereunder, provided there is no particular mention, all of the numerical values are expressed in decimals.

Next, the cycle_count field is an 8000-scale counter for counting the number of cycles. At a timing where the cycle_offset field returns to "0" (each 125 microseconds), the count value thereof counts up by "1". That is to say, the count value of this counter counts to "7999" and returns to "0" every 1 second. Next, the second_count field is a 128 scale counter for counting "seconds", and counts up by "1" at a timing where the cycle_count field returns to "0". This counter value returns to "0" after counting to "127".

Next, the format of the cycle start packet is shown in FIG. 19. In FIG. 19, a node ID (identifier) of the cycle master is contained in the source_ID field which indicates the packet transmission node. Respective unique node IDs are given to the respective nodes connected to the bus. Then, in the destination_ID field showing the packet reception node is stored "FFFF" (hexadecimal) showing multicast for all of the nodes. Next, an "8" showing that there is a cycle start packet, is stored in the t-code (transaction code) field showing the classification of the packet. Then stored in the cycle_time_data field is stored the value of the CYCLE_TIME register which is held by the cycle master when this cycle start packet is transmitted. Fields other than the above have no direct relation to this discussion and hence description thereof is omitted.

The nodes which do not become cycle masters receive the cycle start packet, and the values of the CYCLE_TIME register held by these nodes are overwritten by the values of the cycle_time_data field within the cycle start packet. By so doing, the value of the CYCLE_TIME register which all of the nodes connected to the bus hold, is synchronized with the value of the CYCLE_TIME register which the cycle master holds.

Now, as shown in FIG. 17, when the cycle start packet is transferred, the node for which the band has been previously acquired, starts transmitting the isochronous packet. Then, after a period where there is no data transfer, referred to as an "isochronous gap" has elapsed, bus arbitration is carried out, and transfer of the packet is performed in order from the node which has acquired the packet transmission right. By repeating these steps, transfer of all of the isochronous packets for which the band has been acquired is completed. By so doing, even if the period of the gap corresponding to the isochronous gap has elapsed, transmission of the isochronous packet by any of the nodes ceases.

Then, even if a period longer than the isochronous gap, referred to as a "sub-action gap" has elapsed, and no isochronous packets are detected, this becomes a period for transferring a best effort type packet, referred to as asynchronous packet. The transfer period for the asynchronous packet continues until a cycle start packet showing start of the next cycle is detected. In the above manner, the first half of the respective cycles is assigned to the transfer period for the band secured isochronous packet, and the remaining latter half is assigned to a best effort type asynchronous packet transfer period. Here the band which can be used as a transfer period for the isochronous packet is controlled to a maximum of 80% with respect to the total (one cycle). In this way, a condition where the asynchronous packet cannot be transferred at all is avoided.

Cycle master attempts the transmission of a cycle start packet at a timing which the cycle_count field of the CYCLE_TIME register increments. However, the cycle start packet also is a type of asynchronous packet of the best effort type. That is, in addition to the timing which depends on the aforementioned CYCLE_TIME register, if the packet transmission right has not been acquired by performing arbitration of the bus after the sub-action gap is detected, then the cycle start packet cannot be transmitted. Consequently, if the packet being transferred is not on the bus, then the cycle start packet can be immediately transmitted at the timing which is incremented by the cycle_count field. On the other hand, in the situation such as the case where the packet being transferred is on the bus, the cycle start packet cannot be transmitted until after transmission of this packet has been completed.

The maximum value of the delay at the time of sending the cycle start packet depends on the allowable maximum packet size of the asynchronous packet. With the 1394 standard, the maximum data field length for the asynchronous packet for respective transmission speeds of S100, S200 and S400 is prescribed as 512 bytes, 1024 bytes and 2048 bytes respectively. Consequently, when processing time for attaching a header or CRC (Cyclic Redundancy Check) field to the data field is also taken into account, the time required for packet transfer is estimated to be approximately 45 microseconds. As will be understood from the above explanation, a cycle frequency of the nominal value of 8 kilohertz controlled by the cycle start packet, essentially has a jitter corresponding to the traffic on the bus. Here, in the case where the cycle start packet is sent later than the original transmission timing, the timing information which also includes this delay, is stored in the cycle_time_data field of the cycle start packet. Furthermore, the timing information stored in the CYCLE_TIME register is updated without depending on the transmission timing of the cycle start packet.

On the other hand, in the 1394 standard, an IEEE 1394 bridge (referred to hereunder simply as a bridge) for performing packet transfer between different buses with a plurality of 1394 standard buses (hereunder referred to as "1394 buses") connected to each other is being studied, and standardization work is being undertaken by a P1394.1 Committee of the IEEE. Large scale and high efficiency of a network using the 1394 standard can be achieved using this bridge. Hereunder, is a description of the basic construction of the bridge, with reference to FIG. 20. The bridge is basically constructed from portals and a switching fabric. That is to say, the portals are the part where the bridge connects to the 1394 bus, and the portals themselves also operate as nodes. Moreover, the switching fabric is a packet switchboard for performing packet transfer between the portals inside the bridge.

In FIG. 20, the example is shown where the bridge 10 is constructed with three portals 20–22 and incorporates a switching fabric 30 which connects these together. However provided the number of portals incorporated in one bridge is more than one, then any number is possible. The portals 20–22 are respectively connected to buses 40–42 being 1394 buses, so that packet transfer is possible between these buses. Nodes 50–52 are respectively connected to these buses 40–42. Here the example is given for the case where a packet is transferred from the node 50 connected to the bus 40, to the node 51 connected to the bus 41 via the bridge 10, and an outline of the bridge operation is described.

At first, the portal 20 receives a packet which the node 50 has transmitted via the bus 40. Then, the received packet is examined to determine if the received packet is one for transferring to buses other than the bus 40. The method for examining this has been variously discussed by the P1394.1 Committee, and here the details are not addressed. Then, in the case where the portal 20 judges that the received packet is one for transferring to other buses, this packet is output to the switching fabric 30. The switching fabric 30 then outputs the input packet to a portal connected to the bus to which the packet is to be transferred. According to this example, the packet is output to the portal 21 connected to the bus 41. As a result, the portal 21 transfers the packet input from the switching fabric 30 to the bus 41, and the node 51 receives the packet via the bus 41, and packet transfer from the node 50 to the node 51 is thus completed.

In the above manner, the portal appropriately performs the operation of transferring the packets from the bus corresponding to its own, to the switching fabric 30, and the operation of transferring the packets from the switching fabric 30 to the target bus, to thereby perform transfer of the packets between the buses. Here, in a subsequent explanation, the former operation performed by the portal is referred to as an "input portal operation", while the latter operation is referred to as an "output portal operation." Furthermore, the portals fulfilling a role similar to that of the above mentioned portal 20 and portal 21 are respectively referred to as "input portals" and "output portals".

Next, in the case where isochronous packet transfer is performed between different buses using the above-mentioned bridge, the transfer intervals between packets on the input portal side must also be maintained on the bus on the output portal side. The reason for this is so that traffic contravening the band of the bus which has been previously acquired for the isochronous packet transfer, is not sent to a bus. For example, in the case where a packet which has been input one packet at a time for each cycle, from the bus on the input portal side is transferred to another bus, then with the bus on the output portal side also, the packet must be transferred at a rate of one packet for each cycle. Nevertheless, if in a particular cycle a packet is not transmitted to the bus on the output portal side, and in the succeeding cycle two packets are transmitted, then in this following cycle, twice the traffic of the acquired band is momentarily sent.

Furthermore, in the 1394 standard, arbitration, gap, and cycle frequency jitter is present as mentioned above. In addition to the presence of these, in order to satisfy an above-described demand with the bridge 10, it is necessary to send the aforementioned isochronous packet to the bus on the output portal side, after applying a fixed delay of several cycles to the isochronous packet to be transferred. Here, the above-mentioned fixed delay which the bridge gives to the isochronous packet is referred to by the P1394.1 Committee as "isochronous delay." Hereunder, is a detailed description of the requirements for this isochronous delay.

At first is a description of arbitration and fixed delay attributable to the gap, with reference to FIG. 21A and FIG. 21B. In these figures is shown in the traffic of the bus on the input portal side and the bus on the output portal side, together with a comparison for the case where cycle delay is not applied (FIG. 21A) and the case where a delay of one cycle is applied (FIG. 21B). Here in the same figures, for convenience the isochronous packets are represented by symbols "A"–"E", however actually each individual isochronous packet is identified according to the value of the channel number stored in the channel field in the header of the isochronous packet.

At the input portal side bus, three types of isochronous packets, A, B and C are transferred. Of these packets, packet A and packet B are regularly transferred, while packet C is only transferred in cycle C2. Furthermore, of the packets A, B and C, only the packet B is transferred between the buses towards the output portal side bus. On the other hand, with the isochronous packets transferred by the output portal side bus, in addition to packet B there is packet D and packet E. Furthermore, the node transmitting packet C, in the process of arbitration, can acquire the bus before the nodes transmitting packet A or packet B. Here, the portions in the figure shown in half-tone dot mesh are periods (hereunder referred to as "isochronous periods") where the isochronous packets are transferred in the respective cycles. The half-tone dot mesh is added to include as far as the sub-action gap showing the completion of the isochronous period.

Against the traffic of the input portal side bus as described above, the traffic of the output portal side bus for the case where a cycle delay is not given by the bridge is shown in FIG. 21A. As shown in this figure, the packet B is transferred from the input portal to the transmit buffer of the output portal, and is temporarily stored in the buffer. Then after the output portal acquires the bus by arbitration, the packet is transmitted to the output portal side bus. In this case, in cycle C1, the inter-bus transfer of the packet B is successfully performed. Here, the transmit buffer of the output portal is realized by a FIFO (first-in-first-out) memory or the like. This FIFO memory is installed on the link layer LSI for realizing a link layer in a layer construction of 1394 standard.

On the other hand, in cycle C2, the packet B is sent to the latter half of the isochronous period as the result of arbitration in the input portal side bus. Therefore, at the output portal side bus, the packet cannot be transmitted within the range of the upper limit of the isochronous period. That is to say, with the example in the figure, after packet E has been transferred, the isochronous gap elapses, and after for a while, the packet B is transferred. Therefore, the time of the sub-action gap at the end of the isochronous period cannot be sufficiently maintained. Consequently, although the transmission of the packet B to the output portal side bus is possible, this becomes a packet which contravenes the 1394 standard.

Furthermore, in cycle C3, there is no transmission of packet D and packet E with respect to the output portal side bus, as with cycle C1 and cycle C2. Therefore, in the timing where the packet B is transferred from the input portal side bus, at the output portal side bus, the sub-action gap is detected and there is a shift to the asynchronous period. Therefore, at cycle C3, packet B cannot be transmitted, and at cycle C3, a packet miss is generated. Here, packet B is transmitted in the cycle after cycle C3.

In the above manner, when a cycle delay is not given by the bridge, the problem arises in that there is a contravention of the upper limit of the isochronous period, and a cycle where an isochronous packet is missed appears.

On the other hand, if the bridge gives a one-cycle delay when the isochronous packet is transferred between buses, then as shown in FIG. 21B, the packet B can be transferred between buses for each cycle without depending on arbitration or a gap. That is to say, the packet B stored in the transmit buffer of the output portal in cycle C1 is transferred between buses in the interval of the isochronous gap from the point in time where the packet E is transmitted in cycle C2. Furthermore, the packet B stored in the transmit buffer of the output portal in cycle C2 is transferred between buses in the interval of the isochronous gap from the point in time where the cycle start packet is transmitted in cycle C3.

Next, referring to FIG. 22A and FIG. 22B is a description of the value of the isochronous delay which becomes necessary when the jitter attributable to traffic occurs in the cycle frequency. Here, as with the case of FIG. 21A and FIG. 21B, the portion shown by the half-tone dot mesh corresponds to the isochronous period. Furthermore, in FIG. 22A and FIG. 22B traffic other than that of packet B is omitted from the figure. Since at the input portal side bus and the output portal side bus, the traffic is mutually independent, then as shown in the figure, the cycle start packet is asynchronously transmitted to the other buses. In such a condition, the appearance for the case where a one cycle fixed delay is given by the bridge when the packet B is transferred between buses, is shown in FIG. 22A.

In the same figure, when the packet B in the cycle C2 of the input portal side bus is stored in the transmit buffer of the output portal, the output portal side bus has already entered cycle C3. Consequently, the packet B should be immediately transmitted to the output portal side bus. However the sub-action gap has already been detected at the output portal side bus, and this has entered the asynchronous period. Therefore, the packet B is transmitted to the output portal side bus in the next cycle C4, and in cycle C3 the packet B is missed.

In this way, if consideration is also given to jitter in the cycle frequency in addition to arbitration or gap, it is insufficient if the bridge only gives a delay of one cycle. That is to say, as shown in FIG. 22B, it is necessary to give a delay of at least two cycles in transmitting the packet transferred to the input portal side bus, to the output portal side bus. Here, a point of caution is that with the isochronous packet, since arbitration starts immediately after the cycle start packet, the isochronous delay must be counted based on the cycle of the output portal side bus.

Next, is a description concerning the transmit buffer amount which is necessary in order to give an isochronous delay of at least two cycles. The above-mentioned FIFO installed on a link layer LSI cancels jitter held by the input packet, by outputting packets at a constant period within a range which does not cause overflow or underflow. That is to say, in the case where FIFO is employed in the inter-bus transfer of the isochronous packets, since isochronous packets are stored in FIFO in a level which does not cause overflow or underflow, the packets are transmitted for each cycle to the output portal side bus. If the minimum two cycle requirement for the isochronous delay as mentioned before, and the presence of jitter of the cycle start packet are considered, then so that a cycle which misses a packet does not occur, transmission to the output portal side bus after packets of three or more cycles have been stored in the transmit buffer can be attempted.

Here, when the isochronous packet is transferred between buses using the above-mentioned transmit buffer control, the appearance of the transition of the transmit buffer amount is shown in FIG. 23. Here, the transmit buffer of the output portal is empty at the start time of the cycle C1. In this case, in cycles C1 to C3, concerning the storage of the packet from the input portal side bus to the transmit buffer, the accumulation amount of the transmit buffer also gradually increases. Then, after the packet C is stored in the transmit buffer, transmission to the output portal side bus is commenced. Here, since there is an influence of jitter held by the cycle start packet, the completion of the storage of the packet C to the transmit buffer is in the cycle C4 of the output portal side bus. Consequently, the packet A stored in the transmit buffer in cycle C1 is transmitted by cycle C5 rather than by cycle C4 so that the isochronous delay becomes four cycles.

Moreover, as can be seen from the graph of transmit buffer accumulation amount shown in FIG. 23, since a packet exceeding the four cycle is stored in the transmit buffer, the capacity of the transmit buffer requires five cycle.

As described above, in the case where a conventional transmit buffer control is used, while ensuring an isochronous delay of two cycles or more, so that a cycle where a packet is missed is not generated at the output portal side bus, it is necessary to maintain a transmit buffer for five cycle. Here at S400 being the maximum transmission speed for the 1394 standard, isochronous packets of approximately 4 kilobytes can be transferred for each cycle. Consequently, in order to accumulate isochronous packets of five cycle, it is necessary to provide transmit buffers of approximately 20 kilobytes in each portal. This value of 20 kilobytes is an extremely large value when considering the current fabrication technology for link layer LSI's, and the resultant cost increase due to the increase in chip size cannot be avoided. In spite of this, even if the size of the transmit buffer is reduced in order to keep down cost, since the buffer which can be used per one cycle is reduced, there is a problem in that this imposes a limit on the transfer throughput of the bridge.

Furthermore, when the conventional transmit buffer control is used, a problem such as shown in FIG. 24 also occurs. That is to say, in the cycle C4 of the input portal side bus, an isochronous packet which is to be transferred to the output portal side bus does not exist, and between the packet C and the packet D there is a space of one cycle. However, due to the effect of smoothing by the transmit buffer, at the output portal side bus, the space between the packet C and the packet D is shortened. That is to say, when the conventional transmit buffer control is used, when a cycle is present where an isochronous packet which is the object of inter-bus transfer is not transferred, the isochronous delay amount given to the packet before the cycle and after the cycle changes. Therefore, there is the problem of the occurrence of jitter in the output portal side bus.

SUMMARY OF THE INVENTION

The present invention takes into consideration the above-mentioned problems with the object of providing an isochronous packet transfer method which can give a constant isochronous delay to an isochronous packet to be transferred, even in the case where there is a transmit delay in the cycle start packet, and which can reduce the size of the transmit buffer which becomes necessary when isochronous packets are transferred between buses. Furthermore, it is a further object of the present invention to provide a recording medium on which is recorded an isochronous packet transfer control program for realizing such an isochronous packet transfer method, a bridge, and a packet transfer control LSI.

With a first aspect of the present invention, an isochronous packet transfer method for transferring an isochronous packet for which the transfer band has been secured in cycle units, between different buses, the method comprising the steps of: generating for each bus of an input side bus and an output side bus, cycle identification information which changes in synchronous with a timing for where a cycle start packet showing a start of the cycle is transmitted to a bus, respectively obtaining for the input side bus and the output side bus, elapsed cycle numbers from previously determined identical timings, based on the cycle identification information, and transmitting after a delay the isochronous packet input from the input side bus, to the output side bus, until a cycle number specified by delay information computed based on the elapsed cycle numbers, elapses on the output side bus.

Moreover, a second aspect of the present invention is an isochronous packet transfer method for transferring an isochronous packet for which the transfer band has been secured in cycle units, between different buses, the method comprising the steps of: respectively generating as input side cycle identification information and output side cycle identification information, cycle identification information which changes each time a cycle start packet showing a start of the cycle is respectively generated on an input side bus and an output side bus, acquiring the input side cycle identification information and the output side cycle identification information at a previously determined identical timing, and respectively generating input side reference cycle identification information and output side reference cycle identification information, and respectively computing a first value being an elapsed cycle number from a cycle showing the input side reference cycle identification information to a point in time where the isochronous packet appears on the input side bus, and a second value being an elapsed cycle number from a cycle showing the output side reference cycle identification information to a point in time where the isochronous packet is to be transmitted on the output side bus, generating delay information based on the first value and the second value, and transmitting the isochronous packet after a delay, to the output side bus until a cycle number indicating the delay information elapses on the output side bus.

With the first aspect and the second aspect, the buffer amount necessary for transferring the isochronous packets between buses can be reduced compared to heretofore. Furthermore, even under conditions where a transmit delay of the cycle start packet exists, a constant transfer delay is given to the isochronous packet.

Moreover, with a third aspect of the present invention, the respective procedures of the above-mentioned isochronous packet transfer are executed on a computer.

Furthermore, a fourth aspect of the present invention is a bridge which comprises: a switch circuit for performing packet switching among a plurality of buses which transfer at least isochronous packets for which the transfer band has been secured in cycle units, a plurality of cycle identification information generating circuits for generating cycle identification information which changes each time cycle start packets indicating a start of the cycle are generated on the buses, a plurality of reference cycle identification information generating circuits for acquiring the cycle identification information at previously determined identical timing and generating reference cycle identification information, a delay information generating circuit for generating delay information based on the cycle identification information and the reference cycle identification information, and a delay circuit for transmitting the isochronous packets for transfer between the buses after a delay, to the output side bus until a cycle number specified by the delay information on the output side bus elapses, wherein performs an operation as an input portal for outputting a packet received from the input side bus to the switch circuit, and an operation as an output portal for transmitting a packet output from switch circuit to an output side bus, and for transferring a packet including at least an isochronous packet between different buses.

As a result, the buffer amount necessary for transferring isochronous packets between buses, by the bridge can be reduced. Furthermore, even under conditions where a transmit delay of the cycle start packet exists, a constant transfer delay is given to the isochronous packet.

With a fifth aspect of the present invention, the respective circuits incorporated in the above-mentioned bridge are integrated to constitute a packet transfer control LSI.

BRIEF DESCRIPTION OF THE DRAWINGS

FIG. 11 is a block diagram showing a construction of link layer LSI according to a fourth embodiment of the present invention.

FIG. 21A and FIG. 21B are timing charts which explain the transfer delay which becomes necessary in the bridge attributable to arbitration or gap, FIG. 21A showing a timing chart for the case where a transfer delay is not given, and FIG. 21B showing a timing chart for the case where a transfer delay of one cycle is given.

FIG. 22A and FIG. 22B are timing charts which explain transfer delay which become necessary in the bridge attributable to jitter of the cycle frequency, FIG. 22A showing a timing chart for the case where a one cycle transfer delay is given, and FIG. 22B showing a timing chart for the case where a two cycle transfer delay is given.

DETAILED DESCRIPTION OF THE PREFERRED EMBODIMENTS

Hereunder is a description of individual embodiments of the present invention, with reference to the drawings.

[First Embodiment]

Figure 1:
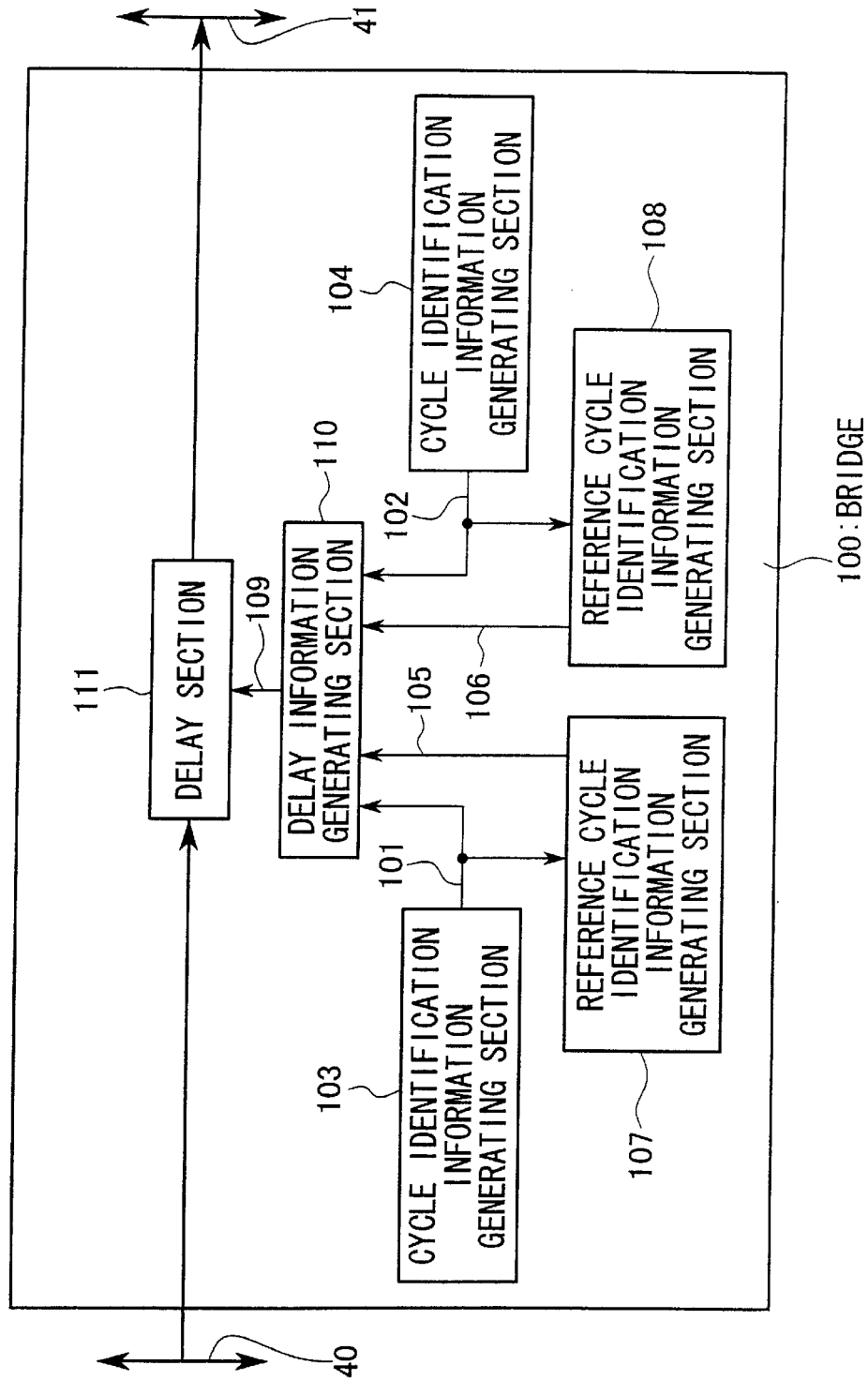
FIG. 1 is a block diagram showing a construction of a bridge according to a first embodiment of the present invention.

This embodiment is for explaining an isochronous packet transfer method according to the present invention, and the basic concept of the construction of a bridge for realizing this method. FIG. 1 is a block diagram showing the construction of a bridge according to this embodiment. Essentially, a plurality of 1394 buses are connected to a bridge 100 shown in the figure. However, portals other than those that serve the role as input portals and output portals have no direct relation to the operation. Consequently, in FIG. 1, illustrations of buses connected to portals which have no direct relation, are omitted, and only bus 40 and bus 41 are shown.

Figure 2:
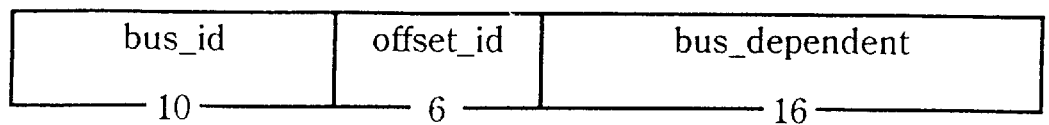
FIG. 2 is an explanatory diagram illustrating a format of a NODE_IDS register prescribed by 1394 standard.

In this connection, the plurality of buses connected to the bridge are identified from each other with an identifier referred to as a "bus ID". This bus ID is stored in the upper 10 bits of a NODE_IDS register which incorporates all of the nodes. Here the format of the NODE_IDS register is shown in FIG. 2. However fields other than the bus ID ("bus_id" in the figure) have no direct relation, and hence description is omitted.

Here for convenience, the bus 40 and the bus 41 are made to operate respectively as an input portal side bus and an output portal side bus. That is, the bridge 100 realizes inter-bus transferring of the isochronous packet by giving an isochronous delay to the isochronous packet output from the bus 40 and then outputting this to the bus 41. Furthermore, in FIG. 1, a switching fabric, and the input portal and output portal are also omitted from the figure. This is because it is assumed that the packet transfer path in the switching fabric has already been decided.

The bridge 100 comprises: cycle identification information generating sections 103 and 104 for respectively generating cycle identification information 101 and 102, reference cycle identification information generating sections 107 and 108 for respectively generating reference cycle identification information 105 and 106 based on the cycle identification information 101 and 102, a delay information generating section 110 for generating delay information 109 based on the cycle identification information 101 and 102 and the reference cycle identification information 105 and 106, and a delay section 1111 for delaying the isochronous packet input from the bus 40 in accordance with the delay information 109, and then transmitting this to the bus 41.

The cycle identification information 101 and 102 is information for respectively identifying the individual cycles on the buses 40 and 41. Each of the values changes at a timing at which the cycle start packets are respectively transmitted on the buses 40 and 41. Here there is no particular meaning to the value of each cycle identification information, and these may be suitable values provided the value increases by one for each advance of the cycle.

As a first example of the cycle identification information, in a timing where the cycle start packet is transmitted to the bus, cycle identification information can be generated by sampling a value of cycle_count in a CYCLE_TIME register installed in the node on this bus. Since as aforesaid the value of cycle_count increases by one for each advance in the cycle, and then corresponding to this, the cycle identification information also increases for each cycle.

As a second example of cycle identification information, counter for counting up for each advance of a cycle, are respectively provided inside the cycle identification information generating sections 103 and 104, and the count values of these may be generated as cycle identification information. The count value of these counters is initialized for example to "0" by resetting the cycle identification information generating sections 103 and 104, taking for example switching on the power as an opportunity. Consequently, by initializing the cycle identification information generating sections 103 and 104 at the same timing, the cycle identification information 101 and 102 is always the same value. However, this type of initialization procedure is also considered to be sequentially performed for each section inside the bridge 100. In this case, as shown later in FIG. 3, the count values of these counters lose their correspondence. However, even if these count values are generated as the cycle identification information 101 and 102, there is no problem at all. Furthermore, it is of course possible to use values generated by methods other than those of the above-mentioned first and second examples, as cycle identification information.

Next, the reference cycle identification information 105 and 106 are values for where the cycle identification information 101 and 102 in each of the reference times are taken in. As mentioned later, with the present embodiment, the elapsed cycle numbers with the cycles indicated by the reference cycle identification information 105 and 106 as a reference, are respectively obtained for each of the bus 40 of the input portal side, and the bus 41 of the output portal side, and by comparing these elapsed cycle numbers with each other, an appropriate delay amount is computed for each packet. Therefore, the reference cycle identification information 105 and 106 must be generated at the same time with respect to the bus 40 on the input portal side and the bus 41 on the output portal side. And yet, this time must be a time where a transmission delay in the cycle start packet does not influence packet transfer.

That is to say, while inter-bus synchronization is roughly taken between a bus and another bus, since each of the portals is basically independent, then a discrepancy occurs in the value of the CYCLE_TIME register between one portal and other portal. Hence, when the reference cycle identification information 105 and 106 is generated, it is necessary that the timing for sampling the cycle identification information is adjusted with either one of the input portal side and the output portal side. Therefore, with the present embodiment, the value of the CYCLE_TIME register in the bus of the output portal side (bus 41 in FIG. 1) is used to determine the above-mentioned reference time.

Here, as mentioned before, the cycle start packet can be sent with a delay of, at the most, about 45 microseconds from the change in the value of cycle_count. Therefore, if the reference cycle identification information 105 and 106 is generated within the range of 45 microseconds to 125 microseconds (that is to say the end of the cycle) from the point in time of the change in the value of cycle_count, then the above-mentioned conditions are satisfied. Here if this timing range is converted to the value of the cycle_offset field, this gives a range of "1100"–"3071". Therefore, a value within this range is determined beforehand, and at the timing where cycle_offset becomes this value, then for example if the cycle identification information is acquired by sampling, the reference cycle identification information 105 and 106 can be produced simultaneously at a time where packet transfer is not influenced by the transmission delay of the cycle start packet.

Here, the timing for producing the reference cycle identification information can be appropriately determined by considering for example ease of design. For example, with the present embodiment, as mentioned later, the reference cycle identification information is generated only at a certain specific time, and after this, the value of the reference cycle identification information is not changed. On the other hand, with for example a later mentioned second embodiment, the reference cycle identification information is generated for each one cycle. Moreover, the reference cycle identification information need not necessarily be generated for each one cycle, and for example the reference cycle identification information may be generated for each five cycles. However, by generating the reference cycle identification information for each one cycle, the circuit construction of the reference cycle identification information generating sections 107 and 108 can be somewhat simplified.

Furthermore, in generating the reference cycle identification information, the construction is not limited to using the value of the cycle_offset in the bus 40 on the input portal side or the bus 41 on the output portal side as mentioned here, and for example a construction such as the following may be considered. That is to say, the clock source for generating the timing for sampling the reference cycle identification information may be provided in the bridge 100, with the construction being such that the sampling timing is instructed from this clock source with respect to the reference cycle identification information generating sections 107 and 108. However, with the former construction, there is the advantage that it is not necessary to prepare a new clock source, as with the latter construction.

Next is a description of a computation method for when the delay information generating section 10 generates the delay information 109 on input of the cycle identification information 101 and 102, and the reference cycle identification information 105 and 106. At first, the delay information generating section 110 respectively computes a first value obtained by subtracting the reference cycle identification information 105 from the cycle identification information 101, and a second value obtained by subtracting the reference cycle identification information 106 from the cycle identification information 102. Here, the first and second values correspond to the elapsed cycle number, with the reference cycle where the reference cycle identification information 105 and 106 is generated in the respective bus 40 and bus 41.

Next, the delay information generating section 110 computes a third value obtained by subtracting the second value from the first value. This third value indicates a relative value of the cycle numbers which have elapsed at the bus 40 on the input portal side from after the reference cycle identification information 105 is generated, when the elapsed cycle number at the bus 41 on the output portal side, from after the reference cycle identification information 106 is generated is made a reference. Consequently, for example if the third value is "0", this shows that the time for the same cycle number at the two buses has elapsed, while if the third value is "−1", this shows that at the bus 41 on the output portal side, a cycle "1" greater than for the bus 40 on the input portal side has elapsed. Then finally, the delay information generating section 110 adds a fixed delay to the third value, and generates this as delay information 109.

Here, with the present embodiment, two cycles are added as this fixed delay. However the value of the fixed delay may be a minimum of two cycles, but need not necessarily be two cycles. Naturally, this fixed delay of two cycles is a minimum delay value so that jitter is not generated, and is the ideal value for the value of the fixed delay. The reason for this is that the isochronous transfer mode is inherently a transmission mode for transmitting data of a real time system, and it is desirable that the delay amount for the packet due to passing through the bridge is as small as possible. Furthermore, in the case where the isochronous packet is transferred passing through several bridges, the delays for each passing of the bridge accumulate. Hence there is a great necessity for minimizing the delay amount for each bridge.

Figure 3:
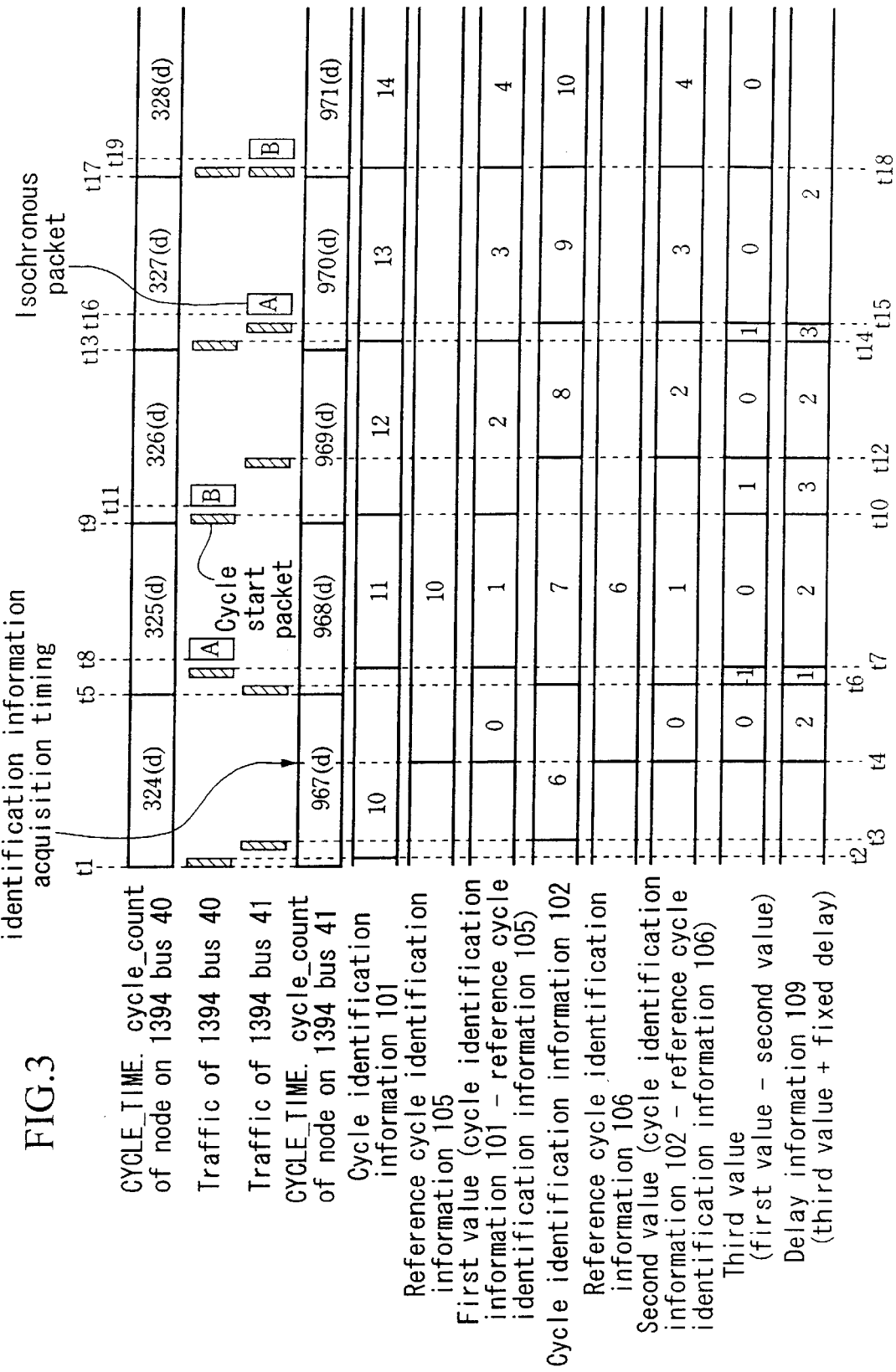
FIG. 3 is a timing chart showing an operation at the time of transferring isochronous packets using the bridge according to the first embodiment.

Next is a description of the operation for when isochronous packet transfer is executed using a bridge 100 incorporating the above-mentioned construction, with reference to the timing chart of FIG. 3. Here in FIG. 3 there is a notation "(d)". This particularly shows that the numerical value immediately prior is a decimal number. Here between the bus 40 and the bus 41, inter-bus synchronization has already been established.

The inter-bus synchronization which is necessary with performing inter-bus transfer of the isochronous packet, is performed for example as follows. In order to transfer the isochronous packet, it is necessary that all of the nodes are operated according to the same cycle frequency. Then, observing a certain bus, all of the nodes connected to this bus are synchronized with a cycle frequency held by the cycle master and operated, based on a cycle_time_data field contained in the cycle start packet.

Consequently, in order to perform inter-bus transfer of the isochronous packet, this may have a mechanism for synchronizing all the cycle frequency held by the cycle master existing in each bus. More specifically, in the overall network, only one cycle frequency which becomes the master cycle frequency is set, and the values of the CYCLE_TIME register of individual cycle masters may be controlled so that all of the cycle masters are synchronized with this master cycle frequency. Here, in this case since synchronization of the cycle frequencies is the object, then only the value of the cycle_offset field need be controlled, and after synchronization is established, it is not necessary to make the values of the cycle_count field coincide in all of the buses.

Furthermore, here in order to simplify the explanation, it is assumed that the phases of the cycles in the buses 40 and 41 are synchronized with each other. In other words, it is assumed that the timing for changing the value of the cycle_offset field of the CYCLE_TIME register, and these values is the same for both buses. However, the value of the cycle_count field of the CYCLE_TIME register does not coincide between the buses 40 and 41. Furthermore, in order to simplify the explanation, the time necessary for transfer of the packets between portals inside the bridge 100 is ignored.

When in this condition where inter-bus synchronization is established between the buses 40 and 41, the cycle_count of the CYCLE_TIME register which holds the node on the respective buses at the time t1 shown in FIG. 3 changes, the cycle masters of the respective buses transmit the respective cycle start packets. That is to say, at the time t2 the cycle start packet is sent to bus 40, and at time t3 the cycle start packet is sent to bus 41. Furthermore, the cycle identification information is generated at the same time as the sending of the cycle start packet. That is to say, at time t2 the cycle identification information generating section 103 generates "10" as the cycle identification information 101, and this is sent to the reference cycle identification information generating section 107 and the delay information generating section 110. Furthermore, at time t3, the cycle identification information generating section 104 generates a "6" as the cycle identification information 102, and this is sent to the reference cycle identification information generating section 108 and the delay information generating section 110.

Here, with the example shown in the figure, the example is shown for the case where the cycle identification information generating sections 103 and 104 do not sample the value of cycle_count, but rather generate a count value of the internal counter as respective cycle identification information 101 and 102. In addition to this, in the same figure, the case is assumed where reset of the cycle identification information generating sections 103 and 104 is sequentially performed, and the case where a difference of "4" occurs between the cycle identification information 101 and 102 is shown as an example.

Here, the cycle start packet is not transmitted at a timing earlier than the point in time of change of the value of the cycle_count in the respective buses 40 and 41, but may be transmitted with a delay from this point in time of change, depending on the traffic in the cycle immediately before. Therefore, the actual advance of the cycle on the bus is not controlled by the value of the cycle_count of the CYCLE_TIME register, but is controlled by the cycle start packet. Here, as shown in the figure, the value of cycle_count is "324" on bus 40 and is "967" on bus 41, and after this, this is increased by "1" with each change in the cycle.

Next, since time t4 is the timing for generating the reference cycle identification information, the reference cycle identification information generating section 107 samples the cycle identification information 101 and sends this to the delay information generating section 110 as the reference cycle identification information 105. Furthermore, in the same time t4, the reference cycle identification information generating section 108 samples the cycle identification information 102 and sends the obtained reference cycle identification information 106 to the delay information generating section 110. In so doing, the delay information generating section 110 computes the first through third values in accordance with the above-mentioned procedures. In this case, since the cycle identification information and the reference cycle identification information in the respective buses all coincide, then these values all become "0". Therefore, the delay information generating section 110 sends a "2" obtained by adding the fixed delay "2" to the third value "0", to the delay section 111 as the delay information 109. Here, at the cycle to which time t4 belongs, since the isochronous packet does not exist on the bus 40, the delay section 111 does not perform the operation for delaying the isochronous packet.

Next, at time t5, on shifting to the next cycle, the value of cycle_count changes, and at time t6, when the cycle start packet is transmitted to the bus 41, the cycle identification information 102 changes from "6" to "7". As a result, the second value becomes "1" [=(7−6)], and hence the third value becomes "−1" [=(0−1)], and the delay information generating section 110 outputs a "1" [=2+(−1)] as the delay information 109. At the time t7 when the cycle start packet is transmitted to the bus 40, the cycle identification information 101 is updated to "11", and hence the first value also becomes "1" the same as the second value, and the third value becomes "0". Consequently, the delay information generating section 110 again outputs a "2" as the delay information 109.

Then, at time t8, the packet A is input to the bus 40. However the value of the delay information 109 at this time is "2", and hence due to the operation of the delay section 111, at the output portal the packet A is delayed by two cycles. Consequently, the isochronous packet input to the bridge 100 is transmitted to the bus 41 in the cycle where the value of the cycle identification information 102 is "9" [=(7+2)]. Then, the subsequent operation becomes the same as mentioned before. That is to say, when at time t9, the value of cycle_count is changed to become a new cycle, at time t10 the cycle start packet is transmitted to the bus 40, and the cycle identification information 101 is updated to "12". As a result, the first value becomes "2", and the third value becomes "1", and hence a "3" is obtained for the delay information 109.

Therefore, if the isochronous packet is input, this is transmitted to the bus 41 in the cycle where the cycle identification information 102 is "10" [=(7+3)] cycle. After this, at time t11, packet B is input to the bus 40. However the delay information 109 at this time is "3", and hence at the output portal, packet B is delayed by three cycles. Consequently, the packet B output to the bridge 100 is transmitted to the bus 41 in the cycle where the value of the cycle identification information 102 is "10". Next, at time t12, when the cycle start packet is transmitted to the bus 41, the cycle identification information 102 is updated to "8" and together with this the second value becomes "2", and hence the third value becomes "0", and a "2" is obtained for the delay information 109.

When a new cycle is entered at the subsequent time t13, a cycle start packet is transmitted to the bus 40 at time t14 and the cycle identification information 101 is updated to "13". As a result, the first value becomes "3" and the third value becomes "1", and hence a "3" is obtained for the delay information 109. Then, at time t15, when the cycle start packet is transmitted to the bus 41, the cycle identification information 102 is updated to "9" and together with this, the second value becomes "3", and hence the third value again becomes "0", and the delay information 109 becomes "2". Then when time t16 comes after an isochronous gap from time t15, the delay section 111 transmits the packet A input to the bus 40 at the time t8 two cycles before, to the bus 41.

Next, at time t17 a new cycle is entered and at time t18, when cycle start packets are transmitted approximately simultaneously to the bus 40 and the bus 41, the cycle identification information 101 and 102 are respectively updated to "14" and "10". As a result, the first value and the second value both become "4", and hence the third value becomes "0" and the delay information 109 remains at "2". Then when time t19 comes after an isochronous gap from time t18, the delay section 111 transmits the packet B input to the bus 40 at the time t11 three cycles before (that is to say where the cycle identification information 102 is "7") to the bus 41.

In the above manner, with the present embodiment, the value of the isochronous delay can be held constant without being dependent on the jitter existing in the cycle start packet. Then, in the case where the isochronous delay is made the minimum value of two cycles, it is sufficient to provide an accumulation capacity of three cycles for the transmit buffer. That is to say, when compared to the transmit buffer control according to the conventional technology described above, it is possible to reduce the transmit buffer by two cycles. Furthermore, since a transfer delay is individually given for each isochronous packet to be transferred, then jitter in cycle units does not occur in the packets at the time of inter-bus transfer.

Moreover, the cycle identification information for the input side and the output side increases by one for each occurrence of a cycle start packet and then returns to "0". As a result, for generating the cycle identification information for the input side and the output side, a simple circuit such as a binary counter can be used.

Furthermore, the reference cycle identification information 105 and 106 are generated by acquiring the cycle identification information 101 and 102 at a timing where the cycle_offset in any of the buses becomes a predetermined value and holding this. As a result, it is no longer necessary to provide an independent clock source or the like for generating the timing for acquiring the cycle identification information, and the construction can thus be simplified.

Moreover, the fixed delay amount when the delay information is generated, becomes a time corresponding to "2" cycles. Therefore the isochronous packet can be transferred in a minimum delay amount without the occurrence of jitter, thus being ideal for transferring data which requires real time properties. In particular, with a construction with the bridges connected in multistage, since the delay accumulates each time a bridge is passed, the effect due to reducing the delay amount for each bridge is significant.

[Second Embodiment]

Figure 4:
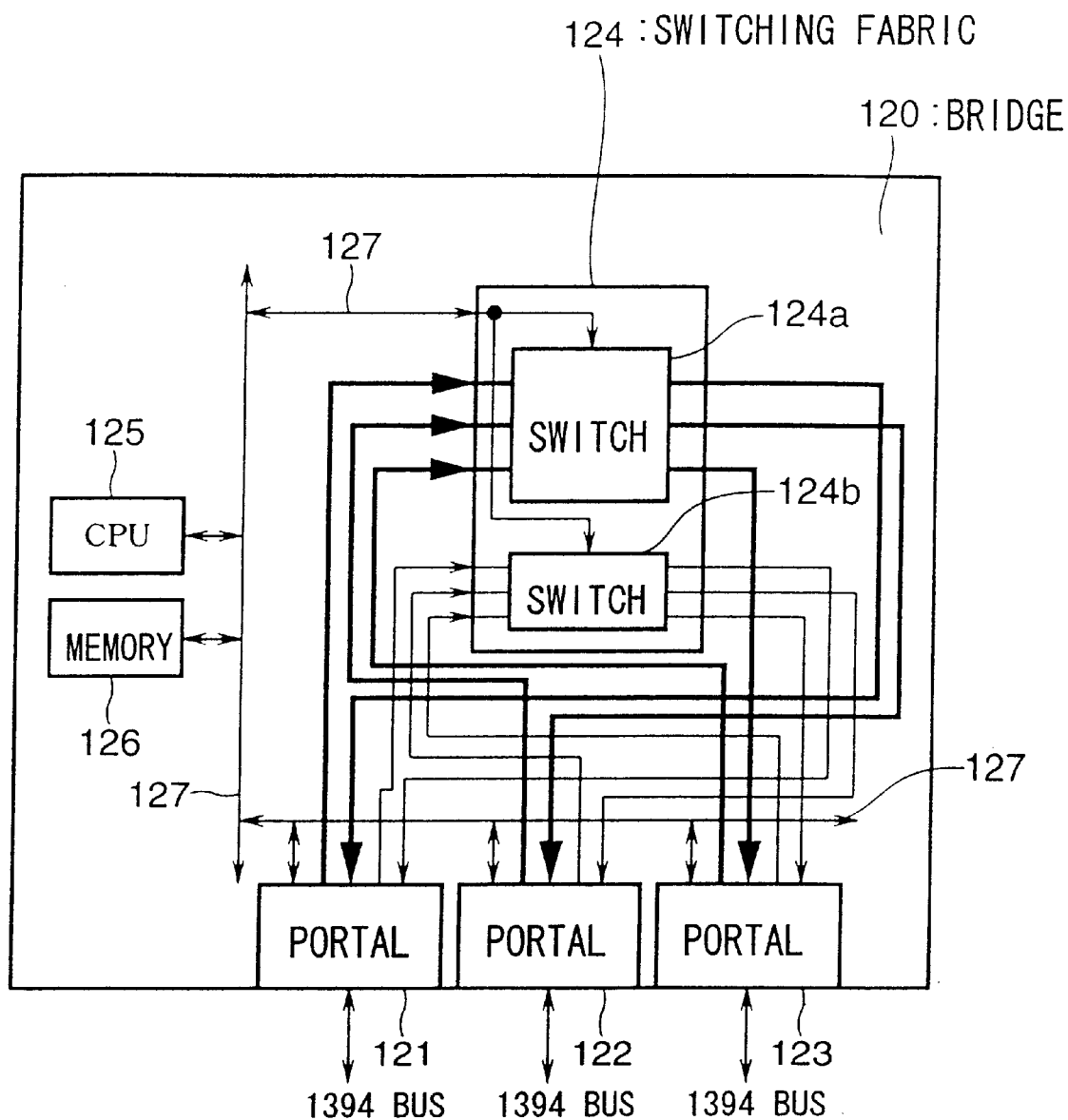
FIG. 4 is a block diagram showing a construction of a bridge according to a second embodiment of the present invention.

FIG. 4 is a block diagram showing a specific actual example of the bridge described for the first embodiment. The bridge 120 shown in this figure has: three portals 121–123, a switching fabric 124, a CPU (central processing unit) 125 for overall control of the operation of the bridge 120, a memory 126 for use as a memory for storing a program for controlling the operation of the CPU 125, or which the CPU 125 uses as a working storage, and a host bus 127 for transferring control signals or data between these functional blocks. The portals 121–123 all have the same construction, and each has two independent ports for transmitting/receiving isochronous packets to and from the switching fabric 124. In addition to this, all of the portals 121 to 123 also have two independent ports for transmitting/receiving cycle identification information to and from the switching fabric 124.

To correspond to this, the switching fabric 124 has six respective input ports and output ports. Three input/output ports of these input/output ports are for exchange of isochronous packets, while the remaining three input/output ports are for exchange of cycle identification information. That is to say, the switching fabric 124 comprises a three port switch 124a for exchange of isochronous packets, and a three port switch 124b for interchange of cycle identification information. The switching fabric 124 controls the two switches 124a, 124b by receiving instructions from the CPU 125 via the host bus 127. As a result, the two switches are linked so that the two switches connect between the same input portals and output portals so as to perform path selection. Incidentally, since the construction of the switching fabric is outside the object of 1394 standard, the bridge manufacturer can appropriately determine the detailed construction thereof.

Figures 5, 10:
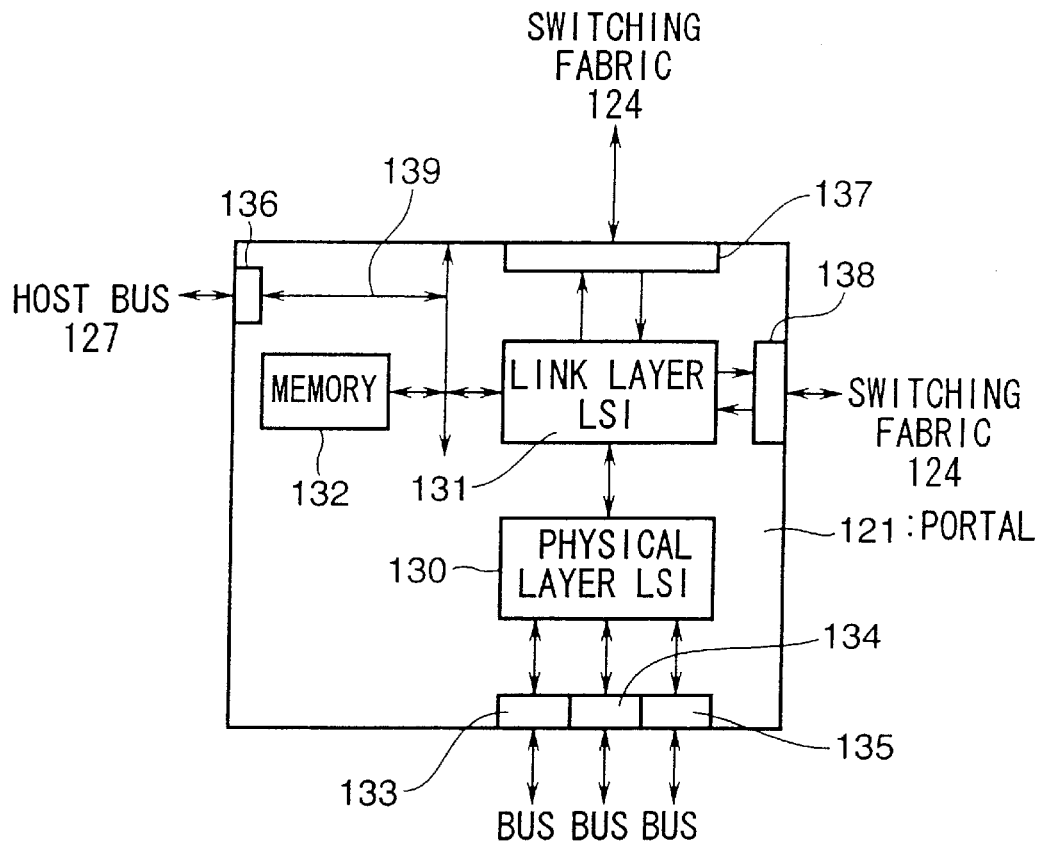
FIG. 5 is a block diagram showing a construction of a portal according to the second embodiment.
FIG. 10 is an explanatory diagram illustrating a format of a PHY configuration packet stipulated by 1394 standard.

Here, FIG. 5 is a block diagram showing an internal construction of the respective portals shown in FIG. 4. Since as mentioned above, the construction of the respective portals is the same, then in FIG. 5 the portal 121 is shown as representative of these. As shown in the figure, the portal 121 basically comprises a physical layer LSI 130, a link layer LSI 131, and a memory 132. Of these, the physical layer LSI 130 is for realizing a function conforming to the physical layer of standard 1394, and is connected to three ports 133 to 135 serving as 1394 ports for connecting to the 1394 bus ("bus" in the figure). On the other hand, the link layer LSI 131, in addition to the function conforming to the link layer of 1394 standard, incorporates an isochronous transfer function described later, and transmits/receives isochronous packets or cycle identification information for transfer between buses.

On the other hand, with the memory 132 there is installed a CSR (Control and Status Register) which is necessary for operating the portal 121 as a node. Besides this, the portal 121 is connected to the host bus 127 shown in FIG. 4, via a host bus connection port 136, and is connected to the switch 124a and the switch 124b inside the switching fabric 124 shown in FIG. 4, via an isochronous packet transfer port 137 and a cycle identification information transmitting/receiving port 138. Here reference symbol 139 denotes an internal bus for connecting the link layer LSI 131, the memory 132, and the host bus connection port 136.

Figure 6:
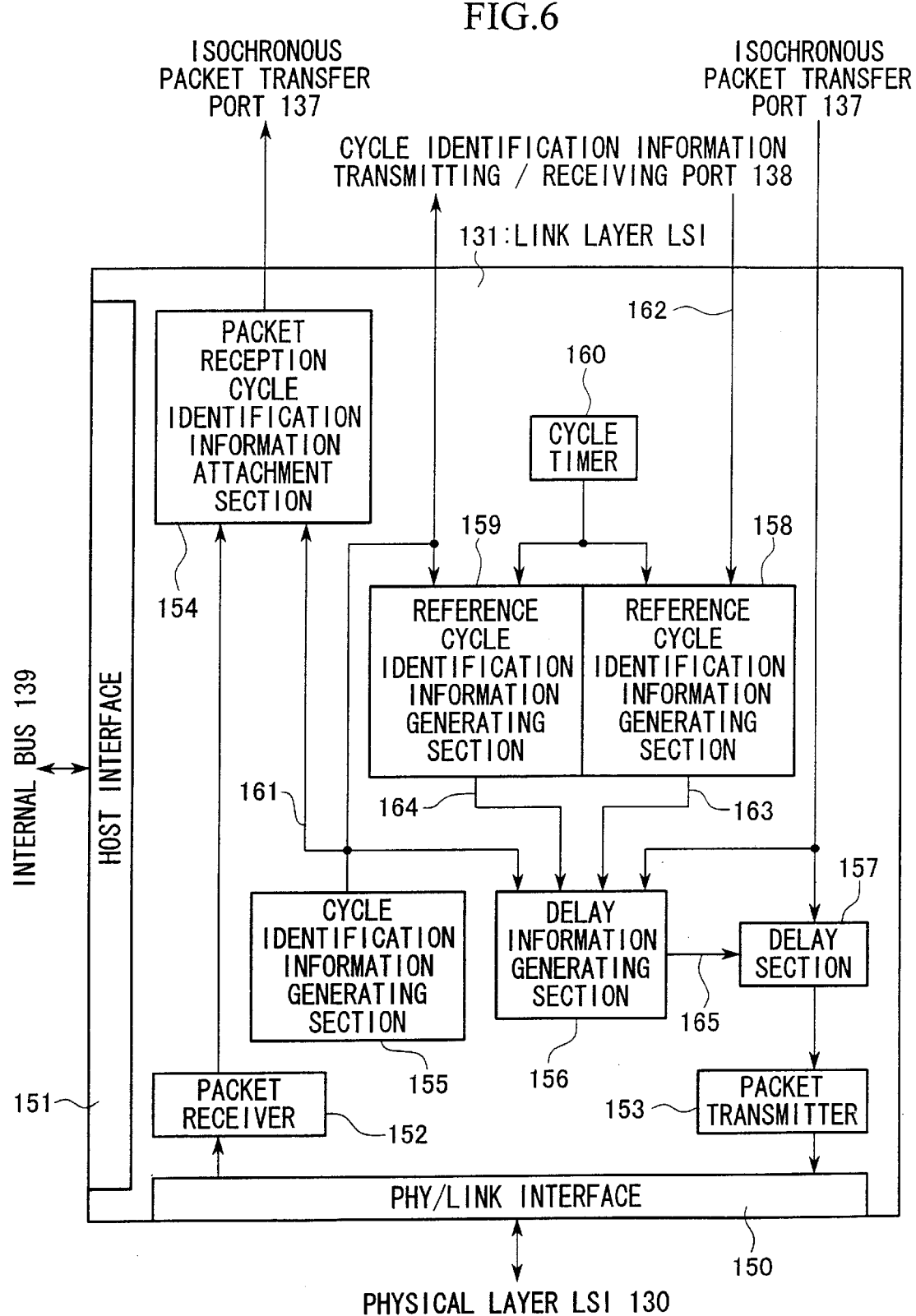
FIG. 6 is a block diagram showing a construction of a link layer LSI according to the second embodiment.

Next, FIG. 6 is a block diagram showing the internal construction of the link layer LSI 131 shown in FIG. 5. As shown in the figure, the link layer LSI 131 comprises: a PHY/LINK interface 150, a host interface 151, a packet receiver 152, a packet transmitter 153, a packet reception cycle identification information attachment section 154, a cycle identification information generating section 155, a delay information generating section 156, a delay section 157, a reference cycle identification information generating section 158, a reference cycle identification information generating section 159, and a cycle timer 160.

Of these, the packet transmitter 153 and the packet receiver 152 respectively perform packet transmission and reception to and from the physical layer LSI 130 as shown in FIG. 5 via the PHY/LINK interface 150. Next, the host interface 151 is a connection interface for connecting to the host bus 127 shown in FIG. 4 via the internal bus 139 shown in FIG. 5. Next, the operation of the cycle identification information generating section 155, the delay information generating section 156, the delay section 157, and the reference cycle identification information generating sections 158 and 159 is basically the same respectively as the operation of the cycle identification information generating section 103 (104), the delay information generating section 110, the delay section 111, and the reference cycle identification information generating sections 107 and 108 shown in FIG. 1, but detailed operational specifications differ from those mentioned above. The differences between these will be explained later. Besides this, the delay section 157 is connected so that the output thereof is input to the packet transmitter 153, and when the respective portals 121–123 operate as output portals, a cycle delay is given to the isochronous packet.

Next, the packet reception cycle identification information attachment section 154, at the point in time where the isochronous packet is input, attaches the value of cycle identification information 161 output from the cycle identification information generating section 155 (hereunder referred to as the "packet reception cycle identification information") to the input isochronous packet, and outputs this. Therefore, the received isochronous packet of the packet receiver 152 is input to the packet reception cycle identification information attachment section 154 and after the packet reception cycle identification information has been attached, is output to the isochronous packet transfer port 137 shown in FIG. 5. As described later, the packet reception cycle identification information is extremely effective in the case where the time required for packet transfer between portals is so large that this cannot be disregarded with respect to the clock width which is the allowable value. Here the allowable value is increased by the amount for when data is transferred in parallel between buses. For example, by dividing a clock of 49.152 megahertz into two then the above-mentioned nominal 24.576 megahertz clock is obtained. In this case, the allowable value in the case of transferring one bit is approximately 20 ns, and the allowable value in the case of transferring for example one word in parallel as a 16 bit width becomes 20 ns×16=320 ns.

Figure 7A:
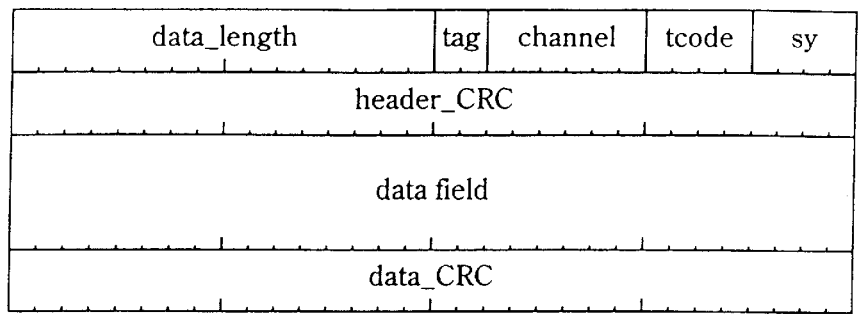
FIG. 7A and FIG. 7B are explanatory diagrams illustrating a specific method at the time where a packet reception cycle identification information attaching section in the second embodiment attaches packet reception cycle identification information to an isochronous packet, FIG. 7A showing a format of the isochronous packet, and FIG. 7B showing an isochronous packet which stores packet reception cycle identification information with a header attached to the head.
Figure 7B:
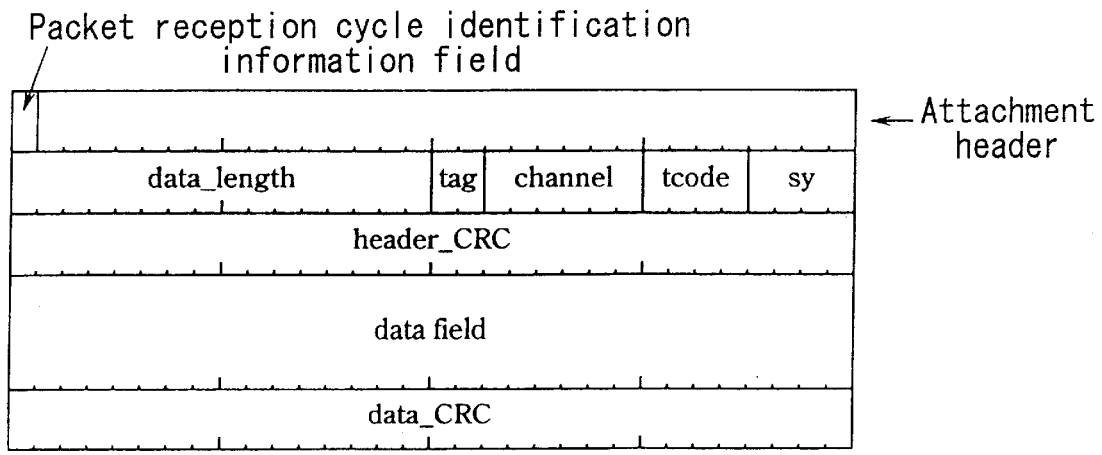

Here, a specific technique for when the packet reception cycle identification information attachment section 154 attaches the packet reception cycle identification information, will be explained with reference to FIG. 7A and FIG. 7B. The isochronous packet having a format shown in FIG. 7A is input to the packet reception cycle identification information attachment section 154. The details of the respective fields of the isochronous packet are of no concern here, and hence no particular explanation is given. The packet reception cycle identification information attachment section 154 then attaches a supplementary header to the head of the input isochronous packet and outputs this. This supplementary header comprises one quadlet (=32 bit), and in this supplementary header is secured a field for storing packet reception cycle identification information. With the present embodiment, as shown in FIG. 7B, the one bit head of the supplementary header is used as the aforementioned field. The reason for this is because with the present embodiment as mentioned later, the cycle identification information is expressed by one bit.

Here referring again to FIG. 6, the cycle identification information generating section 155 is specified so that the cycle identification information 161 alternates between "0" and "1" for each change in the cycle. This corresponds to the case where N=2 in an N scale counter where the value changes circulatory between "0" and "N−1" (where N is an integer of two or more). In the case where this cycle identification information where the value periodically changes is used, then in order to compute the first value and the second value corresponding to the elapsed cycle number from the cycle where the reference cycle identification information is produced based on the cycle identification information and the reference cycle identification information, the following equation can be used.

First value or the second value=(N+cycle identification information value−reference cycle identification information value)%N (1)

Here the notation "A % B" means the remainder obtained by dividing "A" by "B". Consequently, in the case where N is "2" as with the present embodiment, then equation (1) can be simplified as follows:

First value or second value=cycle identification information value XOR reference cycle identification information value (2)

Here the notation "A XOR B" means the exclusive OR of "A" and "B".

Inherently, it can be expected to compute the first value from cycle identification information 162 and from reference cycle identification information 163. However, the first value in this embodiment is computed based on the packet reception cycle identification information (refer to FIG. 7B) attached to the isochronous packet which is received at the portal 121 being the input portal, and on the reference cycle identification information 163. Therefore, as shown in FIG. 6, the isochronous packet sent from the isochronous packet transfer port 137 is input to the delay information generating section 156 rather than the cycle identification information 162.

Furthermore, the packet reception cycle identification information is input to the portal 122 accompanied with an inter-portal transfer delay of 10 microseconds attached to the isochronous packet. Therefore, the first value is obtained by taking the exclusive OR of the reference cycle identification information 163 and the value for where a 10 microseconds delay is given to the cycle identification information 162. On the other hand, when computing the second value, since the cycle identification information generating section 155 and the reference cycle identification information generating section 164 are in the same output portal, it is not necessary to consider the inter-portal transfer delay.

Next, the reference cycle identification information generating section 158 generates reference cycle identification information 163 based on the cycle identification information 162 transferred from the input portal side, and outputs this to the delay information generating section 156. On the other hand, the reference cycle identification information generating section 159 generates reference cycle identification information 164 corresponding to the output portal side bus based on the cycle identification information 161 which the cycle identification information generating section 155 outputs, and outputs this to the delay information generating section 156. That is to say, while the reference cycle identification information generating section 158 uses the cycle identification information 162 sent from outside of the link layer LSI 131, the reference cycle identification information generating section 159 uses the cycle identification information 161 generated inside the link layer LSI 131. Besides this, delay information 165 which the delay information generating section 156 outputs, controls the delay amount of the isochronous delay by means of the delay section 157.

Incidentally, with the present embodiment, after the isochronous packet has been input to the portal 121 which operates as an input portal, an inter-portal transfer delay of approximately 10 microseconds occurs until this reaches the delay section 157 of the portal 122 which operates as the output portal. On the other hand, the inter-portal transfer delay of the cycle identification information 162 which is transferred on a different path to the isochronous packet is negligible compared to the inter-portal transfer delay of the isochronous packet. Consequently, the isochronous packet input to the delay section 157 in the output portal appears with a delay corresponding to the above-mentioned inter-portal transfer delay with respect to the cycle identification information 162 for input to the reference cycle identification information generating section 158 of the same output portal. Due to the influence of such a delay, the delay information 165 can be erroneous. With the present embodiment, in order to solve this problem, the above-mentioned packet reception cycle identification information is used, and the reference cycle identification information is generated in a time band where the influence of the inter-portal transfer is not suffered.

Accordingly, the latter point will be explained in further detail. Generally, the difference between the transfer delay of the isochronous packet and the transfer delay of the cycle identification information between portals is made "d1" microseconds. By so doing, the time band in which the reference cycle identification information can be generated, becomes a range of "45+d1" microseconds–125 microseconds when the point where the value of cycle_count changes at the boundary between one cycle and the next cycle is made the reference. Here, irrespective of the results of inter-band synchronization between the bus 40 and the bus 41 shown in FIG. 1, a two-microsecond offset is generated at the change point of cycle_count of the CYCLE_TIME register on both of these buses. Since the time band which generates this offset is also not appropriate for generating the reference cycle identification information, it is necessary to exclude this from the above-mentioned time band. Consequently, if the maximum value of the phase offset occurring in the inter-bus synchronization period is made "±d2" (where d2 is a rational number equal to or above 0) microseconds, then in the case where the above-mentioned inter-portal transfer delay is not considered, the time band where the reference cycle identification information can be generated becomes a range from "45+d2" microseconds–"125–d2" microseconds, with the point in time where the value of cycle_count changes as the reference.

Furthermore, in the case where both of the inter-portal transfer delay and the phase offset are considered, the time band where the reference cycle identification information can be generated becomes a range from "45+d1+d2" microseconds to "125–d2" microseconds, with the point in time where the value of cycle_count changes as the reference. As described above, since d1=10 microseconds and d2=2 microseconds, then ultimately the range from 57 microseconds–123 microseconds becomes the time range where the reference cycle identification information can be generated. Accordingly, with the present embodiment, the timing for generating the reference cycle identification information is the point in time after 100 microseconds has elapsed from the point in time where the value of cycle_count changes. In the case where this timing is converted to the value for cycle_offset, the reference cycle identification information generating sections 158 and 159 has the specification for respectively sampling the cycle identification information 162 and 161 at a timing where the value of cycle_offset is "2458", to create the reference cycle identification information 163 and 164. Here, with the present embodiment, the cycle identification information is acquired for each cycle at a timing where the value of cycle_offset becomes the above-mentioned value, and the reference cycle identification information is generated.

Next, the cycle timer 160 creates the values of the above-mentioned CYCLE_TIME register and supplies these to the reference cycle identification information generating sections 158 and 159. This cycle timer 160 can be constructed with a counter for counting up at a clock of the nominal 24.576 megahertz.

Figure 8:
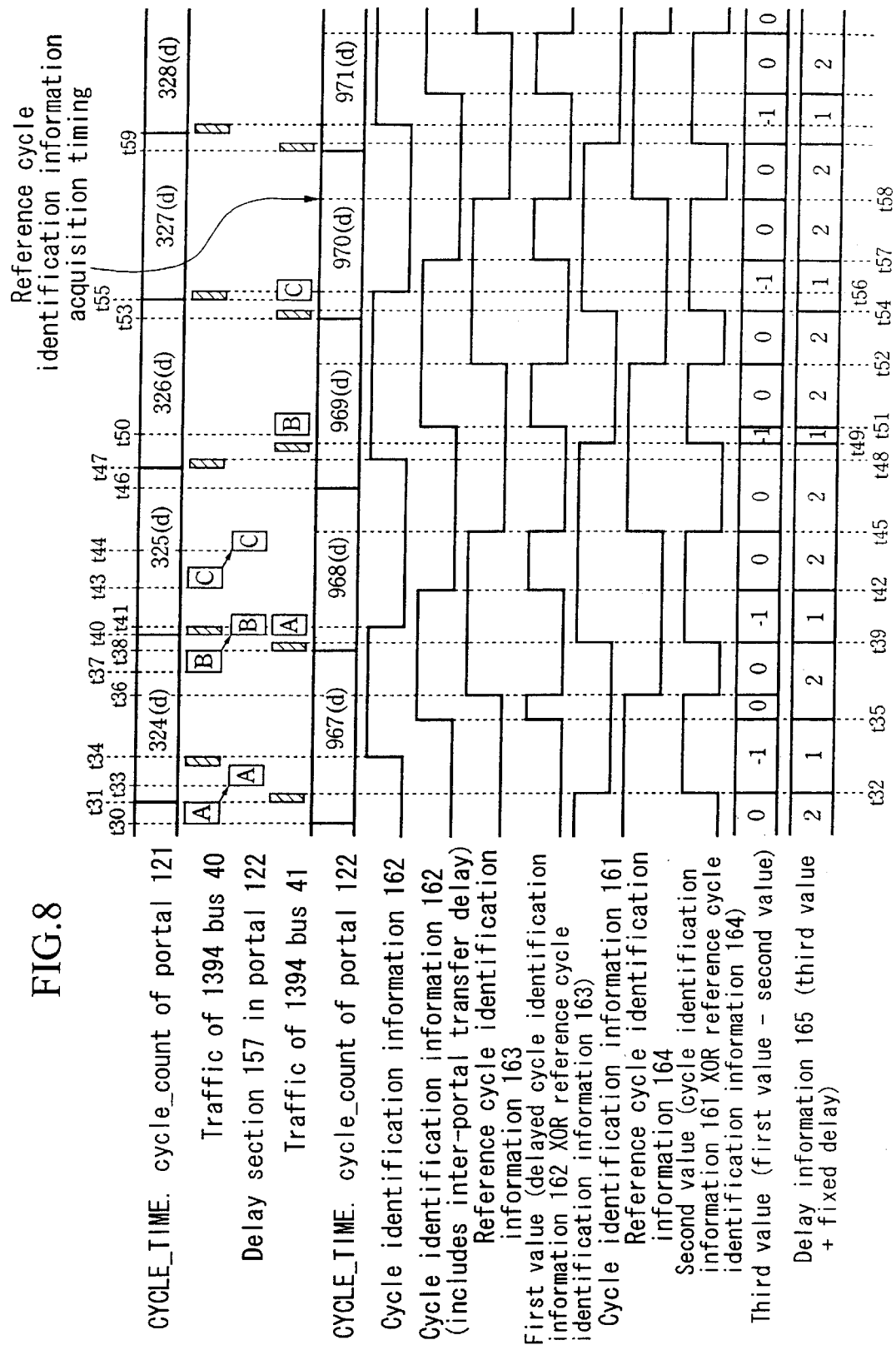
FIG. 8 is a timing chart showing an operation at the time of transferring isochronous packets using the bridge according to the second embodiment.

After this, referring to the timing chart shown in FIG. 8, in the bridge 120 of the above-described construction, a description is given for the operation at the time when the isochronous packet is transferred from the portal 121 shown in FIG. 4 to the portal 122. Here, in FIG. 8, in order to avoid complexity, only three packets A–C are shown as traffic on the bus 40. However, in practice it can be assumed that other packets are steadily input to the bus 40.

At first, at time t30, a packet A appears at the bus 40 being the input portal side bus. Moreover, accompanying the change in the cycle on the portal 122 side being the output portal, the cycle_count inside the CYCLE_TIME register also changes to "967". At the same time t30, the cycle identification information 162 which includes the inter-portal transfer delay and the reference cycle identification information 163, both become "0". Furthermore, the cycle identification information 161 and the reference cycle identification information 164 are both "1". Therefore, the first and second values both become "0", and hence the third value becomes "0" and the delay information 165 becomes "2".

Next, when time t31, accompanying the change in the cycle on the portal 121 side, the cycle_count inside the CYCLE_TIME register also changes to "324". Then when time t32, the cycle start packet is sent to the bus 41. Accordingly, the cycle identification information generating section 155 inside the portal 122, being the output portal, changes the cycle identification information 161 from "1" to "0" at the same time as the sending of the cycle start packet. As a result, the second value becomes "1" being the exclusive OR of the cycle identification information 161 and the reference cycle identification information 164, and hence the third value becomes "−1" [=(0−1)], and the delay information 165 becomes "1" [=2+(−1)]. As a result, the packet A is delayed in the delay section 157 by one cycle, and in the cycle where the cycle_count inside the CYCLE_TIME register in the portal 122 becomes "968", this is sent from the output portal to the bus 41.

Next, at time t33, the packet A which has been previously input to the portal 121 at the time t30, suffers the inter-portal transfer delay and reaches the portal 122, and is input to the delay information generating section 156 and the delay section 157. Then, when time t34, the cycle start packet is sent to the bus 40. At this time, the cycle identification information generating section 155 of the portal 121, being the input portal, changes the cycle identification information (corresponding to the cycle identification information 161 in FIG. 6, and corresponding to the cycle identification information 162 in FIG. 8) from "0" to "1". Then, the cycle identification information 162 is sent towards the reference cycle identification information generating section 158 on the output portal side.

Hereafter, when after time t34 a time corresponding to the inter-portal transfer delay elapses so that at time t35, the cycle identification information 162 for which the inter-portal transfer delay has elapsed (the cycle identification information 162 in FIG. 8 (after the inter-portal transfer delay)) is changed to "1". As a result, the first value becomes a value "1" obtained by taking the exclusive OR of the delayed cycle identification information 162 and the reference cycle identification information 163. At this time, since the second value remains at "1", the third value becomes "0" and the delay information 165 becomes "2". Here, as described above, since the packets are continuously input to the bus 40, then the packet reception cycle identification information accompanying the packet (not shown in the figure) input in the vicinity of time t34 is transferred. Therefore, as shown in FIG. 8, in order to correspond to the change in the cycle identification information 162 at time t34, at time t35 the cycle identification information 162 (after the inter-portal transfer delay) changes.

The time t36 is a timing for generating reference cycle identification information. Consequently, the reference cycle identification information generating section 158 samples the cycle identification information 162 and outputs this, and changes the reference cycle identification information 163 to "1". Furthermore, at this time, the reference cycle identification information generating section 159 samples the cycle identification information 161 and outputs this, and changes the reference cycle identification information 164 to "0". Since with these results, the first value and the second value both become "0", the third value becomes "0" without change, and the delay information 165 also remains at "2". Then, after this an operation corresponding to the above-mentioned operation is performed.

That is to say, at time t37 the packet B appears on the bus 40. Then at time t38, accompanying the change in the cycle on the portal 122 side, the cycle_count of the CYCLE_TIME register also changes. Then, at time t39 the cycle start packet is sent to the bus 41, and the cycle identification information generating section 155 on the output portal side changes the cycle identification information 161 to "1" at the same time as the sending of the cycle start packet. As a result, the second value becomes "1", the third value becomes "−1", and the delay information 165 becomes "1". Then in the time t40, the cycle at the portal 121 side changes, and the cycle_count of the CYCLE_TIME register also changes.

Furthermore, at approximately the same timing as this, the packet B which has been previously input to the portal 121 at time t37, suffers the inter-portal transfer delay and reaches the delay information generating section 156 and the delay section 157 of the portal 122. As a result, the delay section 157 delays the packet B by one cycle specified by the delay information 165, and the packet B is sent from the output portal to the bus 41 in the cycle where the cycle_count of the CYCLE_TIME register in the portal 122 is "969". Then, since the same time t40 is the timing where the time corresponding to the isochronous gap has elapsed from after sending the cycle start packet at the time t38, the packet A input to the delay section 157 of the portal 122 at time t33 is sent from the portal 122 to the bus 41 with the delay of one cycle.

Next, when time t41, the cycle start packet is sent to the bus 40. In addition to this, since the cycle identification information generating section 155 on the input portal side changes the cycle identification information (corresponding to the cycle identification information 161 in FIG. 6) to "0", this is sent towards the reference cycle identification information generating section 158 of the output portal as the cycle identification information 162. Then, at time t42 where a time corresponding to the inter-portal transfer delay time has elapsed from time t41, the cycle identification information 162 (corresponding to the cycle identification information 162 (after the inter-portal transfer delay) shown in FIG. 8) is changed to "0". As a result, the first value changes to "1". However at this time since the second value remains at "1", the third value becomes "0" and the delay information 165 becomes "2".

After this at time t43 the packet C appears on the bus 40, and then at time t44 after the time corresponding to the inter-portal transfer delay time has elapsed, the packet C reaches the delay section 157 of the portal 122. Therefore, the packet C is sent from the portal 122 to the bus 41 in the cycle where the cycle_count of the CYCLE_TIME register in the portal 122 is "970", with the delay of two cycles specified by the delay information 165. Then, at time t45, since this is the timing for generating the reference cycle identification information, the reference cycle identification information generating section 158 samples the cycle identification information 162 and changes the reference cycle identification information 163 to "0", and the reference cycle identification information generating section 159 samples the cycle identification information 161 and changes the reference cycle identification information 164 to "1". As a result, the first value and the second value both become "0", while the third value and the delay information 165 do not change.

Then, after the cycle has changed at the portal 122 side at time t46, the cycle is also changed at the portal 121 side at time t47. Next, at time t48, the cycle start packet is sent to the bus 40, and the cycle identification information generating section 155 on the input portal side changes the cycle identification information to "1". Therefore, this value is sent towards the reference cycle identification information generating section 158 of the output portal as the cycle identification information 162. Then when the cycle start packet is sent to the bus 41 at the time t49, the cycle identification information generating section 155 on the output portal side changes the cycle identification information 161 to "0" at the same time as the sending of the cycle start packet. As a result, the second value changes to "1" and the third value becomes "–1". Hence the delay information 165 is also changed to "1".

After this, when the time t50 where the time corresponding to the isochronous gap has elapsed from after sending the cycle start packet at the previous time t49 results, the packet B input to the delay section 157 of the portal 122 at the previous time t40 is sent from the portal 122 to the bus 41 with the delay of one cycle. Then, when time t51 after lapse of the inter-portal transfer delay time from the previous time t48, the cycle identification information 162 (after the inter-portal transfer delay) changes to "1". Hence the first value changes to "1", and the third value becomes "0", and the delay information 165 becomes "2". Then, at the time t52, the reference cycle identification information generating section 158 samples the cycle identification information 162 and changes the reference cycle identification information 163 to "1", and the reference cycle identification information generating section 159 samples the cycle identification information 161 and changes the reference cycle identification information 164 to "0". As a result, the first value and the second value both become "0", while the third value and the delay information 165 do not change.

Next, at time t53, the cycle is changed at the portal 122 side, so that when time t54, the cycle start packet is sent to the bus 41. By so doing, the cycle identification information generating section 155 on the output portal side changes the cycle identification information 161 to "1" at the same time as the sending of the cycle start packet. As a result, the second value changes to "1", the third value changes to "–1", and the delay information 165 becomes "1". Then, at time t55, the cycle on the portal 121 side is changed, and together with this, since the time corresponding to the isochronous gap from after sending the cycle start packet at previous time t53 has elapsed, the packet C input to the delay section 157 of the portal 122 at the previous time t44 is sent from the portal 122 to the bus 41 with the delay of two cycles.

Then, at time t56, the cycle start packet is sent to the bus 40. As a result, the cycle identification information generating section 155 on the input portal side changes the cycle identification information to "0", and outputs this towards the reference cycle identification information generating section 158 of the output portal, as the cycle identification information 162. Next, when a time corresponding to the inter-portal transfer delay time has elapsed from the same time t56, at time t57 the cycle identification information 162 (after the inter-portal transfer delay) changes to "0". Therefore, the first value changes to "1", the third value changes to "0", and the delay information 165 becomes "2".

Then, at time t58 the reference cycle identification information generating section 158 samples the cycle identification information 162 and changes the reference cycle identification information 163 to "0", and the reference cycle identification information generating section 159 samples the cycle identification information 161 and changes the reference cycle identification information 164 to "1". As a result, the first value and the second value both become "0", and the third value and the delay information 165 do not change. Then after this, in the cycles after the time t59, operations the same as mentioned above are performed.

In the above manner, with the present invention, inter-bus transfer is realized while equally giving a two-cycle delay to all of the isochronous packets. Therefore, the maximum size for the isochronous packet which can be transferred at a transfer speed of for example S400 is 4 kilobytes. In order to transfer such an isochronous packet, with the conventional technology, a delay portion having an accumulation amount of 20 kilobytes corresponding to 5 cycles is necessary. On the other hand, with the present embodiment, since it is sufficient to provide a delay portion having an accumulation amount of 12 kilobytes for each of the portals, then compared to the conventional technology, the accumulation amount can be reduced by 8 kilobytes.

Furthermore, with the present embodiment, since the delay amount for the packet is computed using the packet reception cycle identification information, the delay amount can be determined without being influenced by the inter-portal transfer delay. Therefore, for example as with the packet B shown in FIG. 8, even if the cycle of the input portal side bus changes between the point in time where this is received by the input portal (time t37) and the point in time where this is transferred to the output portal side (time t40), there is no occurrence of a problem. That is to say, if there is no packet reception cycle identification information, a delay of one cycle greater than the delay amount that should actually be given is given. However, with the present embodiment, this situation does not arise.

Furthermore, since in the computation of the first value and the second value in the present embodiment, N=2, then the cycle identification information on the input side and the output side changes as "0", "1" for each two cycles, and the cycle identification information can be represented by one bit. Therefore, as well as reducing the number of signal lines for transferring the cycle identification information between portals to a minimum, since the number of signal lines is minimal, the construction of the respective portions required for transferring the cycle identification information can be simplified. Furthermore, in computing the first value and the second value, only the exclusive OR of the cycle identification information and the reference cycle identification information need be taken. Therefore, compared to where the remainder calculation is necessary in the case where the cycle identification information circulates in excess of two cycles (that is to say, when N>2), with the present invention this can be completed without performing the remainder calculation, so that a simple circuit of an exclusive OR gate can be used. Therefore, hardware construction can be simplified.

Here in the above-mentioned description, the packet reception cycle identification information is stored in the supplementary header. However, the present invention is not limited to this configuration. For example, the packet reception cycle identification information may be transmitted to an output portal using a separate transmission line to the transmission line for transmitting the isochronous packet.

Moreover, the value of cycle_offset in the timing for generating the reference cycle identification information is made within a range from, the timing corresponding to the maximum delay time from after the value of cycle_count changes until sending of the cycle start packet, to the end of each cycle. Therefore, the reference cycle identification information can be generated without suffering an influence due to the sending of the cycle start packet being delayed, attributable to arbitration of the bus or acquisition of the transmission right.

Furthermore, the reference cycle identification information is generated after the lapse of a time corresponding to the transfer delay of the isochronous packet between the input/output buses. As a result, the reference cycle identification information can be generated in a time band where influence of the transfer delay occurring between the input/output buses is not received. Therefore, even if the cycle of the input side bus changes at the point in time of receiving the isochronous packet from the bus on the input side, and at the point in time of transferring the isochronous packet to the bus on the output side, the problem where the delay information is erroneous does not arise.

Moreover, in the case where the absolute value of the difference of the cycle offset between any buses is made always equal to or less than d2, then the start time for the time band for generating the reference cycle identification information is further delayed by a time corresponding to d2, and the completion time for the same time band is further advanced by a time corresponding to d2. As a result, there is not longer the possibility of the reference cycle identification information being produced in the time band where a phase offset occurs between the buses when the input side bus and the output side bus are inter-bus synchronized.

Furthermore, by also using the packet reception cycle identification information attached to the isochronous packet to generate the delay information, then the reference cycle identification information can be generated in a time band which does not suffer influence of the inter-portal transfer delay. Therefore, even if the bus cycle on the input portal side changes at the point in time of receipt at the input portal and at the point in time of transferring at the output portal side, the problem of the delay information being erroneous does not arise.

[Third Embodiment]

Figure 9:
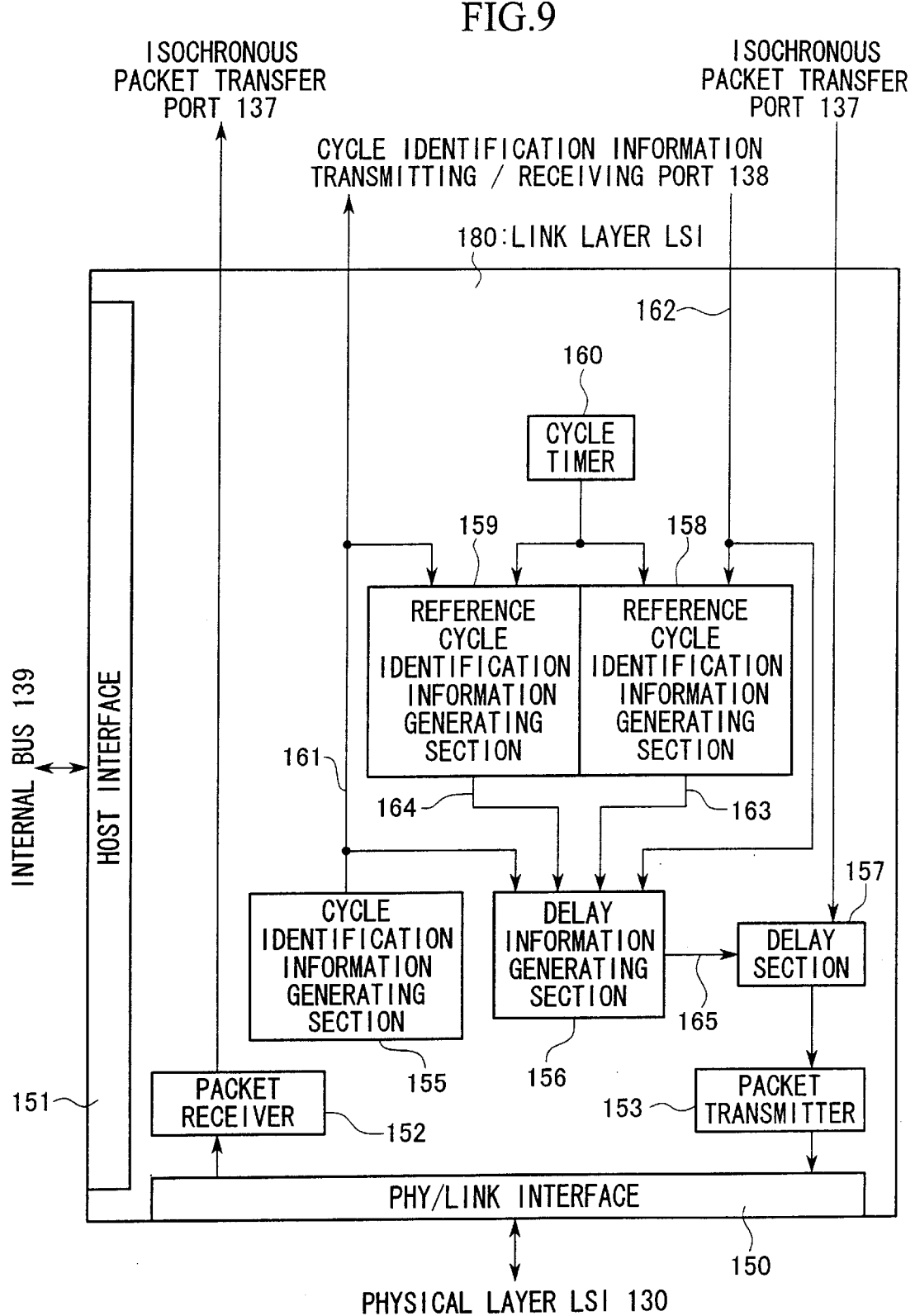
FIG. 9 is a block diagram showing a construction of a link layer LSI according to a third embodiment of the present invention.

This embodiment is one where modifications are added to the second embodiment, with a link layer LSI 180 shown in FIG. 9 being used instead of the link layer LSI 131 shown in FIG. 6. In FIG. 9, components the same as those shown in FIG. 6 are denoted by the same reference symbols. With this embodiment, since packet reception cycle identification information is not produced, the packet reception cycle identification information attachment section 154 present in the second embodiment is no longer present.

With the present embodiment, the first value which is to be computed for the output portal side is computed using the cycle identification information transmitted from the input portal side and the reference cycle identification information generated at the output portal side. Therefore, in contrast to the second embodiment where the cycle identification information 162 was only supplied to the reference cycle identification information generating section 158, with this embodiment, the cycle identification information 162 is also supplied to the delay information generating section 156. Furthermore, in contrast to the second embodiment where the isochronous packet was supplied to the delay information generating section 156 and the delay section 157, with the present embodiment, the construction is such that this is only supplied to the latter.

Therefore, the problem of the occurrence of the error in the delay information attributable to the inter-portal transfer delay as described for the second embodiment, is dealt with by controlling the value of the sub-action gap in the bus on the input portal side so as to be greater than the value of the inter-portal transfer delay. That is to say, in the interval from transmission of the isochronous packet to the bus until the next cycle start packet is transmitted, the time for corresponding at least to the sub-action gap is secured. Therefore, as mentioned above, if the sub-action gap is greater than the inter-portal transfer delay, then while the isochronous packet is being transferred between the portals, the change in the cycle at the bus on the input portal side no longer occurs.

Control of the sub-action gap can be realized by transmitting a PHY configuration packet prescribed by the 1394 standard, to the bus. Here, the format of the PHY configuration packet is shown in FIG. 10. If this is the 1394 standard, then the T field in the figure is set to "1", and by substituting a desired value in the gap_cnt field, the value of the sub-action gap can be optionally controlled. Incidentally, since fields other than these have no direct connection, description is here omitted.

The operation of the bridge in this embodiment can be easily understood from the operation of the second embodiment, and hence explanation will not be repeated here. That is to say, the difference with the second embodiment is that when the isochronous packet is transferred from the input portal to the output portal, the packet reception cycle identification information is not attached, and when the delay information is generated at the output portal side, the cycle identification information 162 is used rather than the packet reception cycle identification information.

As described above, with the present embodiment, since the sub-action gap is greater than the inter-portal transfer delay, when the isochronous packet is transferred to the bus, at least a time corresponding to the sub-action gap is secured until the next cycle start packet is transmitted. Therefore, while the isochronous packet is being transferred between portals, the cycle does not change at the bus on the input portal side. Consequently, in the case where the delay information is generated using the cycle identification information generated at the input portal side and the reference cycle identification information generated at the output portal side, then even if the cycle of the input portal side bus changes at the point in time where this is received on the input portal side and at the point in time when this is transferred to the output portal side, the problem of the delay information being erroneous does not arise.

[Fourth Embodiment]

This embodiment is also one where modifications are added to the second embodiment, with a link layer LSI 190 shown in FIG. 11 being used instead of the link layer LSI 131 shown in FIG. 6. In FIG. 11, components the same as those shown in FIG. 6 are denoted by the same reference symbols. This embodiment is for inter-bus transfer of isochronous packets in which real time data is stored based on IEC (International Electrotechnical Commission) 61883 standard. Hence, with this embodiment, a time stamp conversion function realized by time stamp conversion sections 191 and 192, is added to the link layer LSI 131 described for the second embodiment.

Therefore, at first the time stamp conversion function will be explained. This time stamp conversion function is set by IEC 61883 standard, and is necessary at the time of inter-bus transferring at a bridge, of isochronous packets in which real time data such as moving pictures is stored. With the IEC 61883 standard, a header called a CIP (Common Isochronous Packet) header is attached to real time data, and a standard for storing this in a data field of an isochronous packet is prescribed. Besides this, there is also the case where, depending on the class of moving picture to be transferred, a header referred to as a source packet header is attached to the real time data, and after this a further CIP header is attached and stored in the isochronous packet.

When this isochronous packet is transferred by a 1394 bus, and data decoding is performed on the receiver side, in order to absorb jitter occurring in the 1394 bus, a time stamp is used. The time stamp is stored in the CIP header or in the source packet header, and as well as showing a value further in the future than the current time shown for the CYCLE_TIME register, this shows the timing of passing the data to a decoder which is built in to the receiver itself. That is to say, the time stamp is said to be time information representing the timing for decoding the real time data.

Figure 12A:
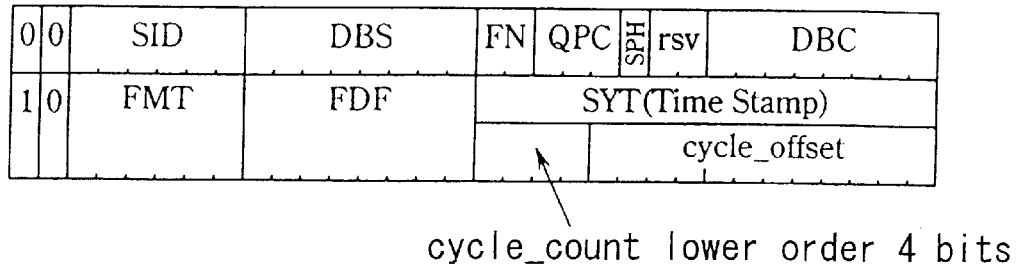
FIG. 12A and FIG. 12B are explanatory diagrams showing formats of headers stipulated by EEC 61883 standard, FIG. 12A showing a format of a CIP header, and FIG. 12B showing a format of a source packet header.
Figure 12B:
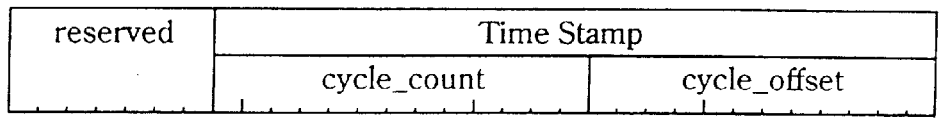

Here, the format of the CIP header and the source packet header is respectively shown in FIG. 12A and FIG. 12B. In the case where a time stamp is stored in the CIP header, then as shown in FIG. 12A, this is stored in the 16-bit SYT field. The values stored in this field are the values of the lower order 4 bits of the 13-bit cycle_count field and the values of the 12-bit cycle_offset field. On the other hand, in the case where a time stamp is stored in the source packet header, then as shown in FIG. 12B, all of the 13 bit cycle_count field and the 12 bit cycle_offset field are stored in the 25 bit time stamp field as the time stamp. Fields other than those described here have no direct connection, and here description thereof is omitted.

As mentioned before, when the isochronous packet is transferred between buses using the bridge, then as well as the two or more cycle isochronous delay being necessary, also after inter-bus synchronization is established, the values of the cycle_count fields in the respective buses generally do not coincide. Due to this, at the time of inter-bus transfer by the bridge, of the isochronous packets in which real time data conforming to IEC 61883 is stored, it is necessary to convert the value of the time stamp in the bridge. That is to say, the bridge performs a conversion so that the difference to the current time which the time stamp holds at the input portal side bus is also kept at the output portal side bus.

However, this conversion is only carried out for the cycle_count part of the time stamp field, and in relation to the SYT field in the CIP header, this is only carried out for the lower order 4 bits of the cycle_count. For example, the case is assumed where the value of cycle_count being the current time is "3", and the value of the cycle_count having the time stamp of the packet received by the input portal is "5". In this case, the value of the latter is greater than the value of the former by "2". Consequently, if the value of cycle_count when the output portal sends this packet is for example "80", the value of the cycle_count which holds the time stamp is converted from "5" to "82".

Figure 18:
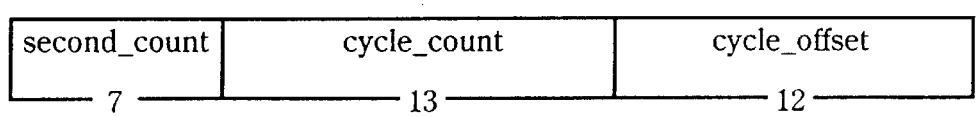
FIG. 18 is an explanatory diagram illustrating a format of a CYCLE_TIME register stipulated by 1394 standard.
Figure 19:
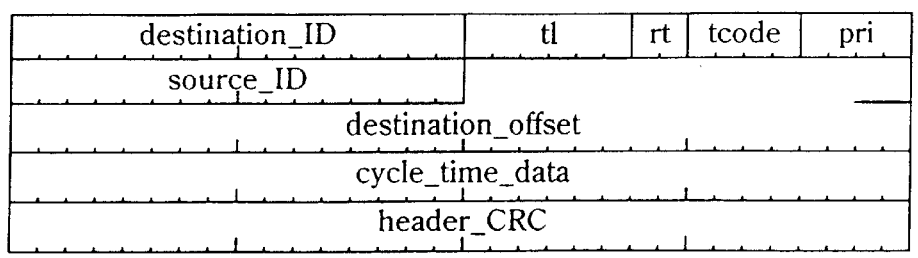
FIG. 19 is an explanatory diagram illustrating a format of a cycle start packet stipulated by 1394 standard.
Figure 20:
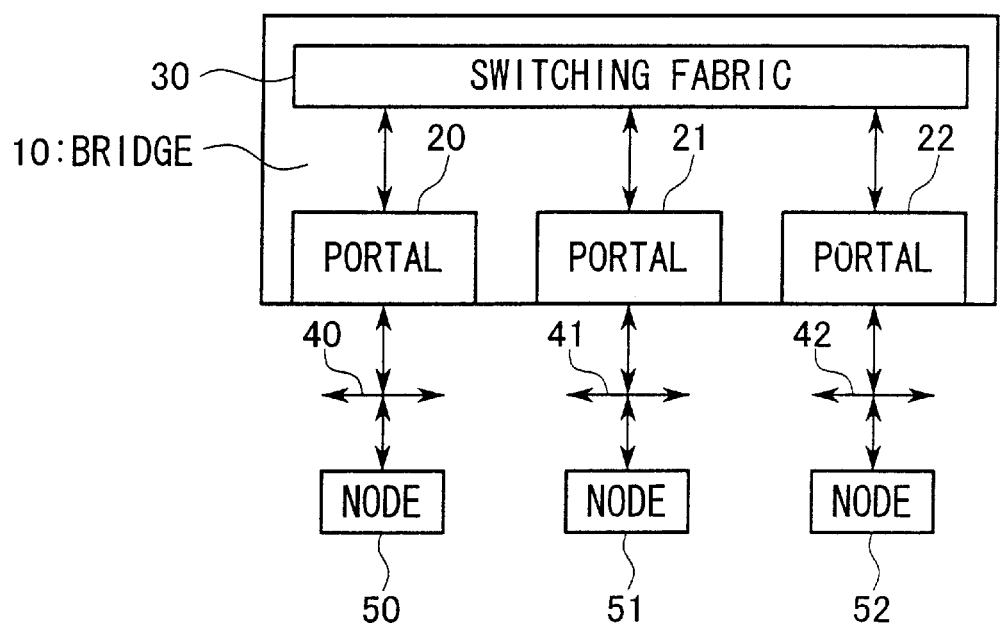
FIG. 20 is a block diagram showing a construction of a bridge according to conventional technology.
Figure 23:
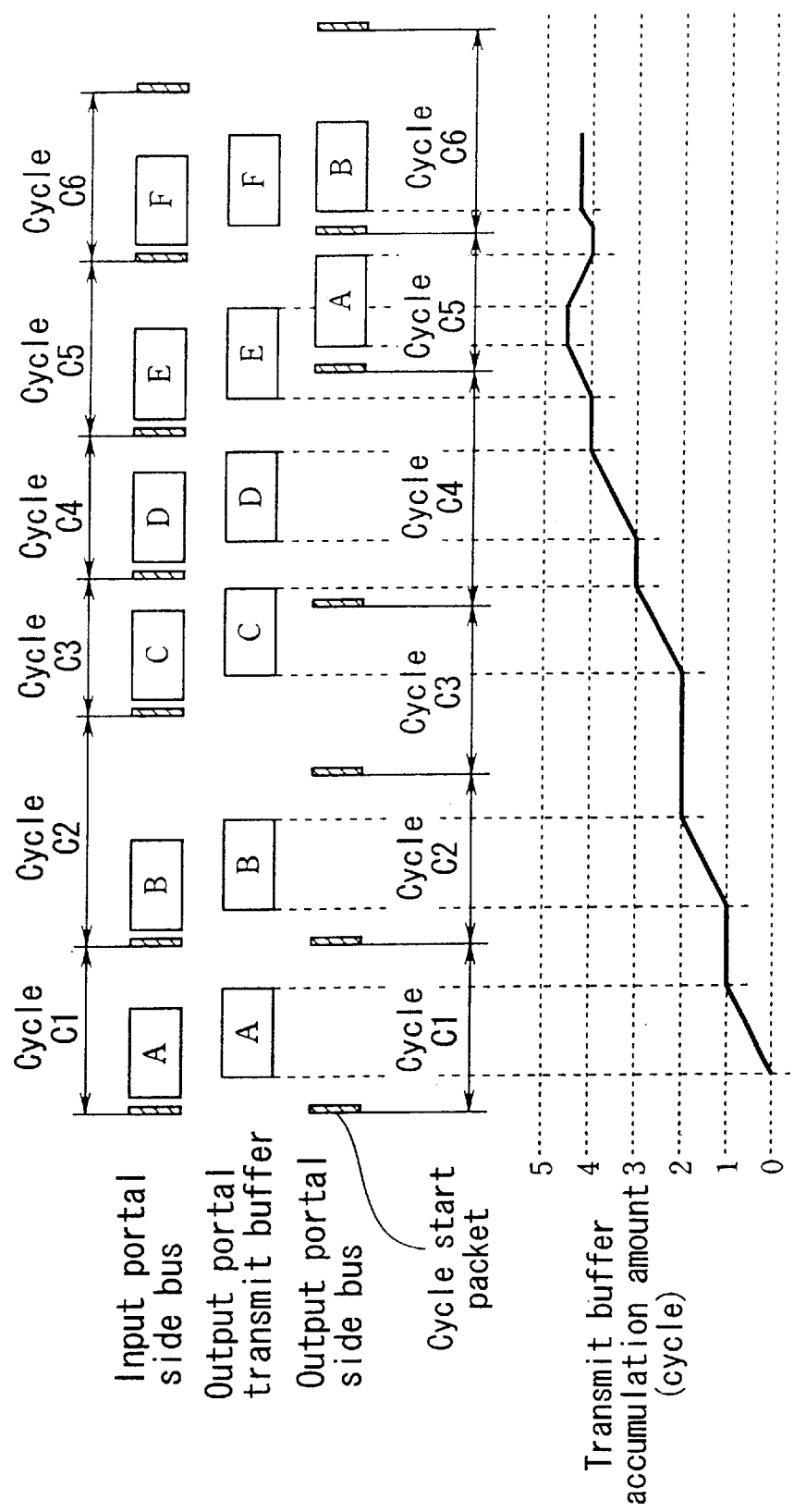
FIG. 23 is an explanatory diagram illustrating a transmit buffer amount which becomes necessary when an isochronous delay is given.
Figure 24:
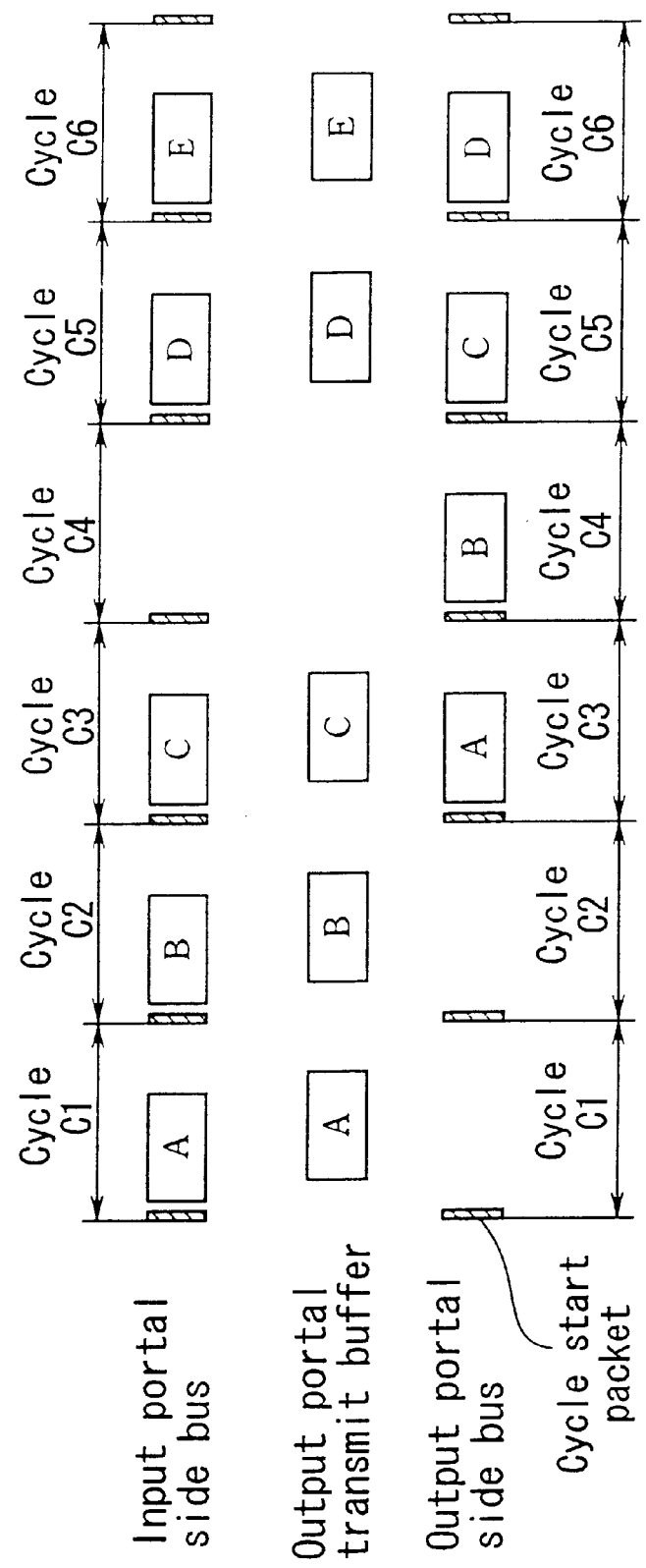
FIG. 24 is a timing chart for explaining a problem where an isochronous delay amount is changed due to influence of smoothing by the transmit buffer.

Returning the discussion to FIG. 11, the time stamp conversion section 191, with the isochronous packet (refer to FIG. 7B) output from the packet reception cycle identification information attachment section 154 as the input, converts the value of the time stamp stored in the data field thereof ("data field" in FIG. 7B). That is to say, the difference which this time stamp holds with respect to the current time is computed, and the value of the time stamp is converted by overwriting with this computed value. At this time, conversion is only performed for the cycle_count part (refer to FIG. 18) of the time stamp. After all, the conversion of the time stamp is performed in accordance with the following equation.

$$\text{Time stamp (after conversion)} = \{8000 + \text{time stamp (before conversion)} - \text{CYCLE\_TIME.cycle\_count}\} \% \, 8000 \qquad (3)$$

Here CYCLE_TIME.cycle_count indicates the value of the cycle_count field stored in the CYCLE_TIME register at the current time.

In the case where the time stamp is stored in the SYT field (refer to FIG. 12A) of the CIP header, only the lower order 4 bits of cycle_count are stored in the time stamp field. Consequently, in this case, the lower order 4 bits of the time stamp (after conversion) obtained by equation (3) may be stored as the value of the final time stamp. Therefore, in this case the following equation may be used as a conversion equation which is made simpler than equation (3).

$$\text{Time stamp (after conversion)} = \{\text{time stamp (before conversion)} - \text{CYCLE\_TIME.cycle\_count}\} \& 0 \times F \qquad (4)$$

Here, the notation "A & B" means taking the logical product of "A" and "B" for each bit. Furthermore, "0×F" means the "F" of a hexadecimal display.

On the other hand, the time stamp conversion section 192 converts the time stamp included in the isochronous packet sent from the switching fabric 124 (refer to FIG. 4) through the isochronous packet transfer port 137. That is to say, the current time for the output portal side is added to the difference between the time stamp and the current time for the input portal side. However, the output from the time stamp conversion section 192 is input to the bus after the delay section 157 has delayed this by a further several cycles specified by the delay information 165. Hence, after the value specified by the delay information 165 has been further added, the time stamp conversion section 192 outputs this to the delay section 157. Therefore, the construction is such that the delay information 165 is supplied to the time stamp conversion section 192.

Ultimately, the conversion in the time stamp conversion section 192 is performed according to the following equation.

$$\text{Time stamp (after conversion)} = \{\text{time stamp (before conversion)} + \text{CYCLE\_TIME.cycle\_count} + \text{delay information 165}\} \% 8000 \qquad (5)$$

Here, if the time stamp is the one stored in the SYT field, then only the lower order 4 bits of the value obtained by equation (5) are used as the final time stamp.

Since the operation of this embodiment is also substantially the same as the operation of the second embodiment, repeated explanation is not given here. That is to say, with this embodiment, as well as the time stamp conversion processing being performed on the input portal side by the time stamp conversion section 191 with respect to the isochronous packet which is to be transferred, on the output portal side, time stamp conversion processing is performed by the time stamp conversion section 192 with respect to the isochronous packet which has been transferred.

In the above manner, with this embodiment, the value of the time stamp attached for expressing the decoding timing of the real time data which the respective portals transfer by means of the isochronous packet, is converted. Therefore, for example isochronous packets in which is stored real time data conforming to IEC 61883 standard can be transferred between buses. At this time, by storing only the lower order 4 bits of cycle_count as a time stamp, a time stamp conversion with respect to the time stamp stored in the SYT field of the CIP header can also be performed. Furthermore, with the present embodiment, since time stamp conversion is performed in accordance with the delay amount which differs for each packet, then even under conditions where a cycle frequency jitter exists, appropriate time stamp conversion is possible. Here in the above description, a real time data based on IEC 61883 standard was made the target.

However, the present invention is of course also applicable to real time data equivalent to this.

[Fifth Embodiment]

Figure 13:
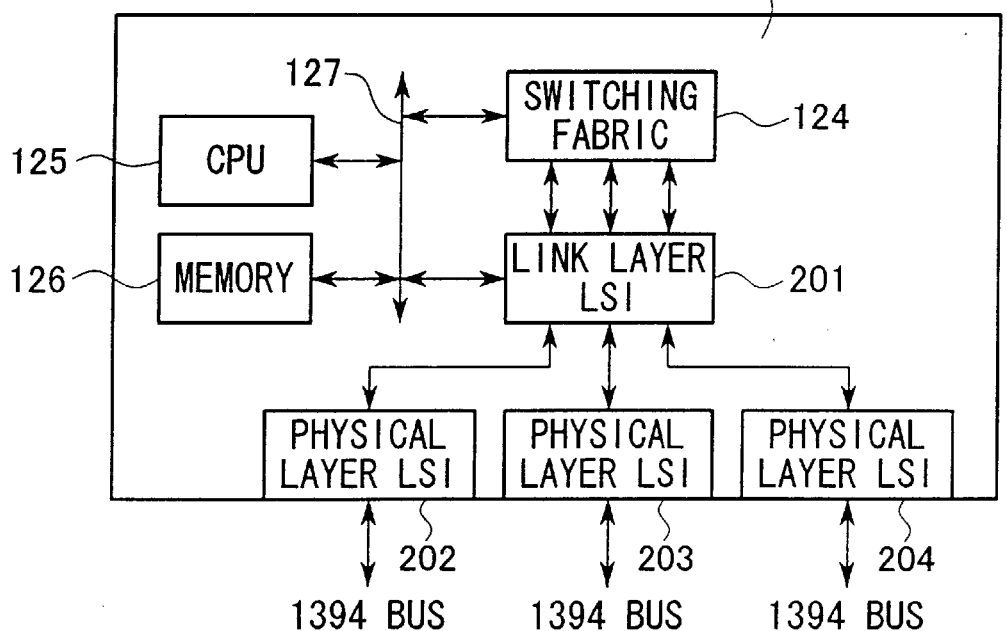
FIG. 13 is a block diagram showing a construction of a bridge according to a fifth embodiment of the present invention.

FIG. 13 is a block diagram showing the construction of a bridge according to this embodiment. Components the same as those shown in FIG. 4 are denoted by the same reference numerals. The bridge 200 of this embodiment has the same functions as those in FIG. 4, being equivalent to a construction provided with three portals. The point different from FIG. 4 is that the portals 121–123 are replaced with a link layer LSI 201 and physical layer LSIs 202–204. That is to say, the function of the link layer LSIs 131 (refer to FIG. 5) provided for the respective portals is consolidated in the link layer LSI 201, and the function of the physical layer LSI 130 (refer to FIG. 5) provided in the individual portals is realized by the physical layer LSIs 202–204.

Figure 14:
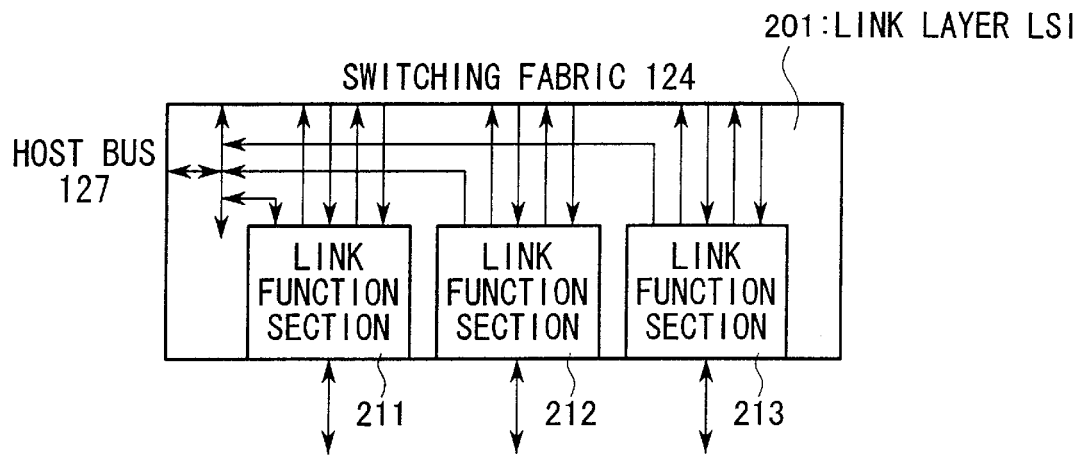
FIG. 14 is a block diagram showing a construction of a link layer LSI according to the fifth embodiment.

Here the inner structure of the link layer LSI 201 is shown in FIG. 14. The link layer LSI 201 shown in the figure has link function sections 211–213 integrated on one chip, and the individual link function sections are operated as a means for realizing the functions of the link layer for a single node. The link function sections 211–213 all have functional blocks equivalent to the PHY/LINK interface 150 shown in FIG. 6, FIG. 9, and FIG. 11, and each link function section is connected to the physical layer LSIs 202–204 shown in FIG. 13. Furthermore, in these link function sections 211–213 is respectively installed functions provided by the link layer LSI 131 shown in FIG. 5.

By means of the above-mentioned construction, then also with the present embodiment, an isochronous packet transfer function exactly the same as that performed by the bridge described for the above-mentioned various embodiments can be realized. Furthermore, by integrating a plurality of portal constructions and installing the functions of a plurality of portals on one chip, there are the following advantages. That is to say, with the present embodiment, compared to where a bridge is constructed using a plurality of chips having the functions of one portal, the signal lines for transmitting/receiving cycle identification information and the like for transferring between these plurality of chips are accommodated on one chip. Therefore, compared to the case where this is constructed with a plurality of chips, then for example it is possible to reduce the number of pins of the chip, and hence the cost of the chip can be reduced.

Besides this, the functions provided by components other than the link layer LSI 201 shown in FIG. 13 may be installed on the link layer LSI 201 as required. For example, a function equivalent to one accomplishing the switching fabric 124 may be installed in the link layer LSI 201. By so doing, the multiple high speed signal lines wired between the switching fabric 124 and the link layer LSI 201 can be accommodated on one chip. Hence this is extremely effective in increasing speed, and in miniaturization of equipment.

[Sixth Embodiment]

With the respective embodiments described above, it is assumed that the bridge which is most important for the packet transfer performance, is achieved by hardware. However, in contrast to this, with the present embodiment, the function of the bridge is achieved by software using a general computer such as a personal computer or a workstation. Recently with such computers, due to rapid progress, high speed and high performance has been achieved, and henceforth considering that CPU performance and the like will be further improved, it can be considered that a bridge realized by software instead of hardware, will also stand up to practical use.

Figure 15:
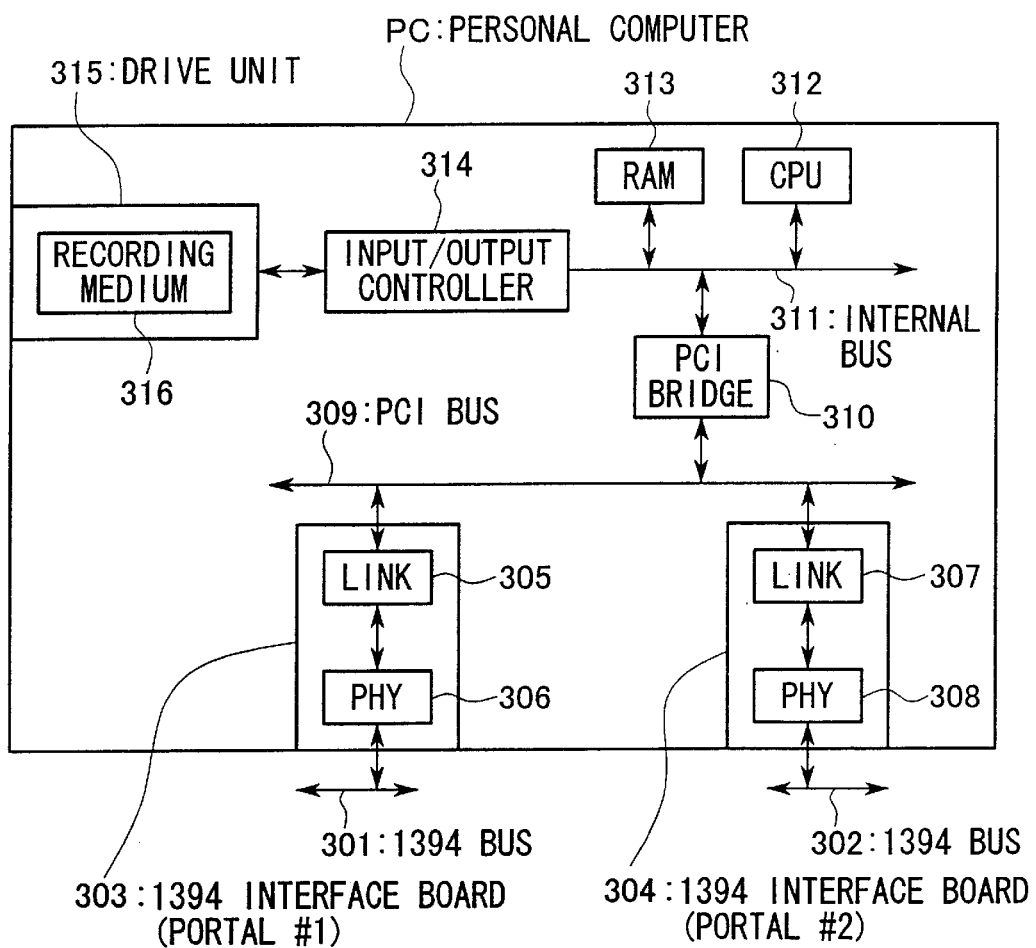
FIG. 15 is a block diagram showing a construction for realizing a bridge function using a personal computer, according to a sixth embodiment of the present invention.

FIG. 15 is a block diagram showing a system configuration example for achieving a bridge according to this embodiment. With the example shown in this figure, a personal computer PC for accomplishing the role of the bridge, performs packet transfer between a 1394 bus 301 and a 1394 bus 302. As shown in the figure, the personal computer PC is provided with two 1394 interface boards 303 and 304, which manage the interface between the 1394 buses 301, 302 connected to these, and the personal computer PC. The interface boards 303 and 304 each correspond to one portal (in the figure respectively portal #1, portal #2). Of these, the 1394 interface board 303 has a LINK chip 305 for realizing a function conforming to a link layer of 1394 standard, and a PHY chip 306 for realizing a function conforming to a physical layer of 1394 standard, and both of these chips accomplish a function equivalent to the PHY/LINK interface 150 shown for example in FIG. 6.

Here, the LINK chip 305 incorporates a transmission buffer for buffering the packet sent from the PHY chip 306 or a later mentioned PCI bus 309. Furthermore, the 1394 interface board 304 has a LINK chip 307, and a PHY chip 308 of the same construction as the LINK chip 305 and the PHY chip 306. Moreover, the 1394 interface boards 303 and 304 are connected to a PCI (Peripheral Component Interconnect) bus 309 being one of the most popular buses, as a bus for personal computer use.

Next, a PCI bridge 310 is a device for interconnecting the PCI bus 309 and the internal bus 311 being the CPU bus. Connected to the internal bus 311 is a CPU 312, a RAM (Random Access Memory) 313, and an input/output controller 314. Here in the same manner as with the CPU bus of a general personal computer, a ROM (Read Only Memory) or various interface cards etc. may be connected to the internal bus 311. The CPU 312 combines the whole of the personal computer PC to realize an operation as a bridge. The RAM 313 in addition to storing programs for controlling the operation of the CPU 312 can also be used as a working storage for the CPU 312. Here, various types of variables described later are used inside the program, and these variables are stored in a variables storage region secured in a register group incorporated in the CPU 312, or in the RAM 313. Incidentally, of the above-mentioned program, the part for controlling the inter-bus transfer of the isochronous packet is particularly referred to as an "isochronous packet transfer control program."

Besides this, a storage region is also secured on the RAM 313 for the cycle identification information 101 and 102 as well as the reference cycle identification information 105 and 106, and the CPU 312 appropriately refers to or updates these values. Furthermore, concerning the CYCLE_TIME register, the cycle timer 160 shown for example in FIG. 6 is connected to the internal bus 311. Alternatively, the CPU 312 which employs a general purpose timer chip can simulate the function of the CYCLE_TIME register. In the case of the latter, the region for the CYCLE_TIME register use is secured on the RAM 313, and the timer chip is connected to the internal bus 311. Furthermore, interruption from the timer chip to the CPU 312 is at the same period as the clock of for example the above-mentioned nominal 24.576 megahertz.

The CPU 312 updates the cycle_offset field with this interruption as the opportunity, and in relation to the cycle_count field and the second_count field, updates these at the point in time where respective cycle_offset field and cycle_count field are wrapped around to "0". Furthermore, the CPU 312 inspects as to whether or not at the timing for updating the cycle_count field, the value thereof is the timing for generating the reference cycle identification information. If so, the CPU 312 fetches the cycle identification information 101 and 102 from the RAM 313, and copies this to the memory regions for the respective reference cycle identification information 105 and 106.

Next, the input/output controller 314 is a device for controlling the interface operation between the internal bus 311 and the various input/output devices. Here by controlling a drive unit 315, it is possible to access a recording medium 316 installed in the drive unit 315.

Next, the recording medium 316 is various computer readable storage media such as a floppy disc, a magneto-optical disc, a CD (Compact Disc) ROM, or a hard disc. The drive unit 315 drives the recording medium 316, and if the recording medium 316 is for example a CD ROM, then the drive unit 315 is a CD ROM drive.

For the computer readable storage medium, this is not limited to the presently mentioned devices which statically store a program. For example this also includes all media such as a device which dynamically holds a program for a short time by way of a communication line such as a common carrier leased line or a telephone line, that is a server or router which can hold, forward, or relay a program or data on a network such as the Internet, or a device which can hold a program for a short time such as with a main memory or a cache memory incorporated in a computer. Furthermore, the above-mentioned program may be one which is transmitted to another computer from a computer in which this program is stored in a storage device or the like, by means of a transmission medium, or transmitted waves in a transmission medium. Here, transmission medium is a medium which has a function of transmitting information such as with a communication line of a communication network such as the Internet, or a telephone line.

On this recording medium 316 is recorded a part or all of a program for making the personal computer PC function as a bridge. That is to say, this program may be one (a module etc.) for realizing a part of a function explained hereunder in detail. Furthermore, this program may be one (an update program or patch) which can realize these functions by a combination of programs already installed in the computer. Then, when the personal computer PC is operated, the program is transferred from the recording medium 316 to the RAM 313 via the input/output controller 314 under the instructions of the CPU 312. After this, the CPU 312 executes the program on the RAM 313 to thereby operate the various parts inside the personal computer PC, thereby realizing a bridge function such as described hereunder.

Figure 16:
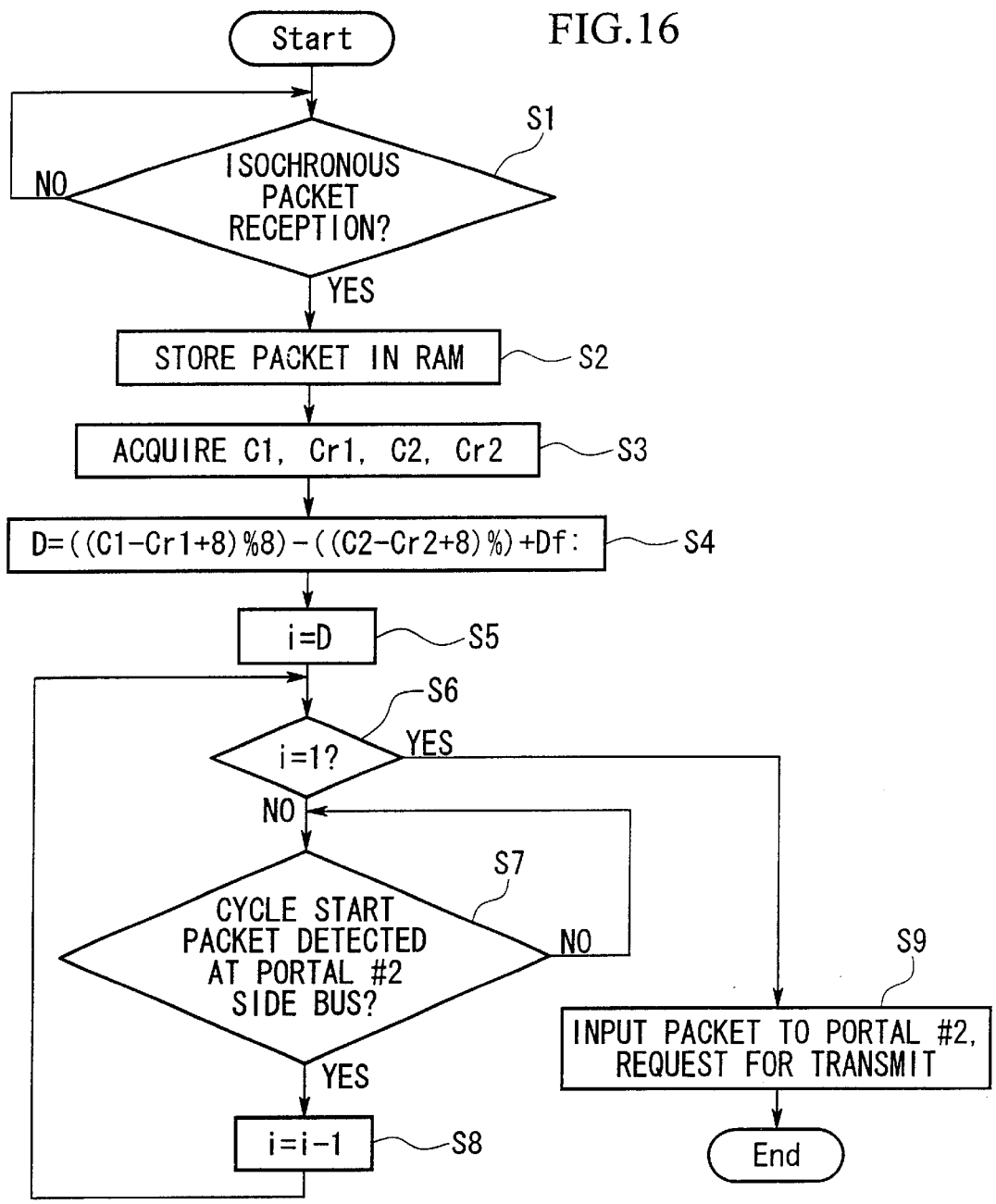
FIG. 16 is a flow chart showing the steps of a process performed on a personal computer according to the sixth embodiment.
Figure 17:
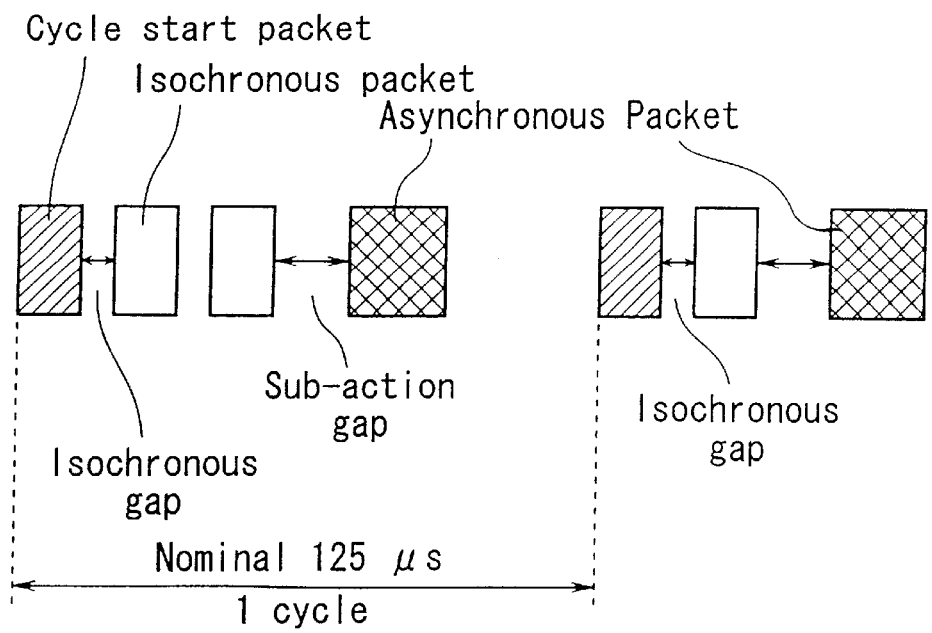
FIG. 17 is an explanatory diagram illustrating a cycle management method stipulated by 1394 standard.

Next, is a description of the procedure at the time of transferring an isochronous packet using the above-mentioned construction, with reference to the flow chart of FIG. 16. Here, in FIG. 16, only the procedure at the time of forwarding an isochronous packet from the 1394 bus 301 to the 1394 bus 302 is shown. For the processes performed by the personal computer PC, other than the above there is also the process of initializing the portals and the process for asynchronous packet transfer between the 1394 bus 301 and the 1394 bus 302. However, since the details of these processes have no direct relation to the points of the present invention, these are not particularly shown as a flow chart. Besides this, the process for transferring of the isochronous packet in the opposite direction to the above from the 1394 bus 302 to the 1394 bus 301 is of course also considered. However in this case, the 1394 buses 301 and 302 and the 1394 interface boards 303 and 304 in the following discussion may instead be respectively read as 1394 buses 302 and 301 and 1394 interface boards 304 and 303.

With the present embodiment, it is assumed that the value of the cycle identification information periodically changes while increasing in increments of "1" in the range from "0"–"7". This corresponds to the case where the value of N explained for the second embodiment is "8". This value of "8" in itself has no particular meaning and may be any value.

First of all, the CPU 312 checks as to whether or not an isochronous packet is being received on the 1394 bus 301 side (step S1). Here, the 1394 interface board 303 continuously monitors the data being transmitted on the 1394 bus 301. Then, in the case where it is detected that an isochronous packet is being received from the 1394 bus 301, the isochronous packet is output to the PCI bus 309 by passing sequentially through the processing by the PHY chip 306 and the LINK chip 305. Thereupon, the PCI bridge 310 further transfers this isochronous packet to the internal bus 311. By the way, the operation discussed up to here is the same as for packets other than isochronous packets (for example a cycle start packet or some other asynchronous packet), and is not only limited to the input portal side but is also the same for the output portal side. Then, in the case where the CPU 312 detects a cycle start packet at least on the input portal side/output portal side, then with this as an opportunity, the respective cycle identification information 101 and 102 are updated.

Next, while an isochronous packet is not being detected (step S1 is "NO"), the CPU 312 checks whether or not an isochronous packet is being received by for example repeatedly checking at constant time intervals. If while doing this it is detected that an isochronous packet has been received (step S1 becomes "YES"), the CPU 312 stores the received isochronous packet for the time being in the RAM 313 (step S2). Then, the CPU 312 computes the delay amount to be given to the received isochronous packet. Therefore, the CPU 312 acquires the cycle identification information and the reference cycle identification information on the 1394 bus 301 side, and respectively stores this in variable C1 and variable Cr1, and acquires the cycle identification information and the reference cycle identification information on the 1394 bus 302 side, and respectively stores these in the variable C2 and the variable Cr2 (step S3).

Next, the CPU 312 computes the first value and the second value in accordance with the above-described respective embodiments (for example equation (1) described for the second embodiment), and then adds a fixed delay amount "2" to the third value obtained by subtracting the second value from the first value, to obtain the delay amount. Here the CPU 312 previously stores the fixed value "2" corresponding to the fixed delay amount in a variable Df. As shown in FIG. 16, in this case the first value is $(C1-Cr1+8)\%8$, and the second value is $(C2-Cr2+8)\%8$. Hence the delay amount is computed as $\{(C1-Cr1+8\%8)-(C2-Cr2+8)\%8\}+Df$. Then, the CPU 312 stores the computed delay amount in the variable D (step S4).

Once the delay amount is computed thus, the CPU 312 copies the value of the variable D to the working variable i (step S5), and then judges if the value of the variable i has become "1" (the reason for performing this judgment will be explained later). Since as mentioned above, the fixed delay amount "2" is included in the variable D, then at first the judgment result for step S6 is always "NO". Therefore, the CPU 312, as with the check of whether or not the isochronous packet is being received at the portal #1 in step S1, checks as to whether or not the cycle start packet is being received at the output side portal #2 (1394 bus 302) (step S7). If this is not being received ("NO" in this step), the CPU 312 checks again for the presence of the cycle start packet at for example constant time intervals.

After this, when one cycle has elapsed at the portal #2 side, the cycle master (not shown in the figure) sends a cycle start packet to the 1394 bus 302. As a result, the cycle start packet is sent to the PCI bus 309 by passing through the processing of the PHY chip 308 and the LINK chip 307 inside the 1394 interface board 304, and as with the case for the isochronous packet, this is forwarded to the internal bus 311 through the PCI bridge 310. Then, when the CPU 312 detects the cycle start packet (step S7 is "YES"), then at that time, the value of the variable i is decremented by "1" (step S8). Then, after this, the processing of steps S6–S8 is repeated.

When this is done, the value of the variable i becomes "1" (step S6 is "YES"). This timing becomes the timing of just one cycle before the timing for transmitting the isochronous packet to the 1394 bus 302. Therefore, the CPU 312 takes out the isochronous packet stored in the RAM 313, and transmits this to the 1394 interface board 304 via the internal bus 311, the PCI bridge 310, and the PCI bus 309, and makes a request so that the isochronous packet is transmitted to the 1394 bus 302 (step S9).

The 1394 interface board 304 stores the isochronous packet to the transmit buffer incorporated in the LINK chip 307. By doing this, the delay corresponding to the last one cycle is given by the transmit buffer. Then, the 1394 interface board 304, at the start of the next cycle immediately after the delay of the last one cycle has elapsed, performs arbitration on the 1394 bus 302, and then transmits the isochronous packet to the 1394 bus 302. Thus, the isochronous packet is transferred from the 1394 bus 301 to the 1394 bus 302.

The operation for attaching the packet reception cycle identification information to the isochronous packet and then transferring this from the input portal side to the output portal side as described for the second embodiment may be done as follows. That is to say, when in step S3 of FIG. 16, the CPU 312 sets the cycle identification information of the portal #1 to the variable C1, the cycle identification information of the portal #1 at that point in time and the value of the CYCLE_TIME register, is used to compute the value for the cycle identification information at the point in time when a time corresponding to the inter-portal transfer delay of the isochronous packet (10 microseconds in the above-mentioned example) has elapsed, and the value for this cycle identification information is stored in the variable C1. Furthermore, the timing for generating the reference cycle identification information may be set beforehand as described for the second embodiment.

Furthermore, making the sub-action gap greater than the value for the inter-portal transfer delay as described for the third embodiment may be done as follows. For example, after the point in time in step S9 when the isochronous packet is transmitted to the portal #2 side (to be more definite, the point in time where the time required for transferring the isochronous packet on the 1394 bus 302 has elapsed) the CPU 312 monitors the time corresponding to the isochronous gap, and the monitoring time at this time may be set to a value greater than the value for the inter-portal transfer delay.

Moreover, in the case of performing time stamp conversion as described for the fourth embodiment, this may be done as follows. That is to say, after the CPU 312 has performed the processing of step S4, the region on the isochronous packet storing the time stamp is taken out, and the value of the CYCLE_TIME register and the value of the variable D corresponding to the delay information 165 are referred to, and the time stamp conversion processing [equations (3) to (4)] explained in detail for the fourth embodiment is executed. The value obtained from this is then used to update the time stamp region of the isochronous packet in the RAM 313. Here, in the fourth embodiment, the processing is performed separately on the input portal side and the output portal side. However, the value of the CYCLE_TIME register used in the time stamp conversion in the output portal side can be computed based on the value of the CYCLE_TIME register in the input portal side and the inter-portal transfer delay. Therefore, the time stamp conversion processing related to the two portal sides may be carried out collectively.

MODIFIED EXAMPLE

The above mentioned various embodiments are all related to bridges having three portals. However, the number of portals provided for each bridge may be any number provided this is "2" or more. In particular, with a bridge incorporating two portals, this may comprise a switching fabric which fixedly connects an input port and an output port connected to mutually different portals. Therefore, the construction of the bridge can be a very simply construction. Moreover in this case, concerning the plurality of link layer LSI's or the link function section, the construction may be such that the interface to and from the switching fabric is a direct connection, with the switching fabric omitted.

Furthermore, with the above-mentioned embodiments, in obtaining the delay amount, the "2" corresponding to the fixed delay amount is added to the third value. However this fixed value "2" may be included in the first value or the second value.

Moreover, in the above-mentioned description, the already standardized IEEE Std. 1394-1995 is assumed. However at the present time, a P1394a and P1394b which are presently in the draft stages, are upwardly compatible with the 1394 standard, and hence the technological concept of the present invention can also be applied to a bus conforming to these. Furthermore, in the above-mentioned description, IEEE 1394 was consistently assumed. However since the isochronous packet transfer is also proposed in the USB specification, then the technological concept of the present invention can also be applied to this bus. In short, the present invention can be generally applied to buses which support isochronous transfer, or transfer modes equivalent to this.

What is claimed is:

1. An isochronous packet transfer method for transferring an isochronous packet for which the transfer band has been secured in cycle units, between different buses, said method comprising:

respectively generating as input side cycle identification information and output side cycle identification information, cycle identification information which changes each time a cycle start packet showing a start of said cycle is respectively generated on an input side bus and an output side bus;

acquiring said input side cycle identification information and said output side cycle identification information at a previously determined identical timing, and respectively generating input side reference cycle identification information and output side reference cycle identification information;

respectively computing a first value being an elapsed cycle number from a cycle showing said input side reference cycle identification information to a point in time where said isochronous packet appears on said input side bus, and a second value being an elapsed cycle number on said output side bus from a cycle showing said output side reference cycle identification information;

generating delay information based on said first value and said second value; and transmitting said isochronous packet after a delay, to said output side bus until a cycle number indicating said delay information elapses on said output side bus.

2. The isochronous packet transfer method according to claim 1, wherein with said input side cycle identification information and said output side cycle identification information, the value of each is incremented by one each time said cycle start packet is respectively generated on said input side bus and said output side bus, and when said value becomes "M−1" (where M is an integer of two or more), the next value becomes "0".

3. The isochronous packet transfer method according to claim 2, wherein said value of "M" is "2".

4. An isochronous packet transfer method according to claim 2, further comprising:
(a) adding a value "M" to a value representing said input side cycle identification information value;
subtracting a value representing said input side reference cycle identification information at a timing when said isochronous packet appears on said input side bus;
dividing by "M";
determining a first remainder, the first remainder being a remainder of the division step of (a); (b) adding a value "M" to a value representing said output side cycle identification information value;
subtracting a value representing said output side reference cycle identification information at a timing when said isochronous packet should be transmitted to said output side bus;
dividing by "M"; and
determining a second remainder, the second remainder being a remainder of the division step of (b).

5. The isochronous packet transfer method according to claim 1, wherein said input side reference cycle identification information and said output side reference cycle identification information are generated by acquiring and holding said input side cycle identification information and said output side cycle identification information at a predetermined timing where time information for either of the buses which include said input side bus and said output side bus becomes a previously determined value.

6. The isochronous packet transfer method according to claim 5, wherein said time information includes cycle offset showing an offset inside each cycle, and cycle count which changes for each of said cycles; and
said predetermined timing is a previously determined fixed timing, which is designated by the value of said offset, between a first timing corresponding to a maximum delay time from the changes in the value of said cycle count until said cycle start packet is transmitted, and a second timing corresponding to the end of each cycle.

7. The isochronous packet transfer method according to claim 6, wherein said first timing is further delayed by a transfer delay time necessary for transferring said isochronous packet from said input side bus to said output side bus.

8. The isochronous packet transfer method according to claim 6, wherein the case where an absolute value of the difference of the values of said cycle offset in any two buses is always equal to or less than "a" (where a is an integer at or above 0), said first timing is further delayed by a time corresponding to said "a" and said second timing is further advanced by a time corresponding to said "a".

9. The isochronous packet transfer method according to claim 1, wherein said delay information is generated by adding a predetermined fixed delay amount to a difference between an elapsed cycle number of said input side bus and an elapsed cycle number of said output side bus.

10. The isochronous packet transfer method according to claim 9, wherein said fixed delay amount is a time corresponding to two cycles.

11. The isochronous forwarding method according to claim 1, wherein said bus is a bus conforming to IEEE 1394 standard.

12. The isochronous packet transfer method according to claim 1, wherein an isochronous packet transfer control program for executing said method is recorded on a computer readable recording medium for execution on a computer.

13. A bridge comprising:
a switch circuit for performing packet switching among a plurality of buses which transfer at least isochronous packets for which the transfer band has been secured in cycle units;
a plurality of cycle identification information generating circuits for generating cycle identification information which changes each time cycle start packets indicating a start of a cycle are generated on said buses;
a plurality of reference cycle identification information generating circuits for acquiring said cycle identification information at a common timing and generating reference cycle identification information;
a delay information generating circuit for generating delay information based on said cycle identification information and said reference cycle identification information; and
a delay circuit for transmitting said isochronous packets for transfer between said buses after a delay, to said output side bus until a cycle number specified by said delay information on said output side bus elapses, wherein said bridge performs an operation as an input portal for outputting a packet received from said input side bus to said switch circuit, and an operation as an output portal for transmitting a packet output from said switch circuit to an output side bus, and for transferring a packet including at least an isochronous packet between different buses.

14. The bridge according to claim 13, wherein
each of a plurality of portals respectively connected to said plurality of buses are provided with, said cycle identification information generating circuit, said delay circuit, said delay information generating circuit, and said first and second reference cycle identification information generating circuits; and
said first reference cycle identification information generating circuit generates said input side reference cycle identification information when a portal to which said first reference cycle identification information generating circuit belongs operates as said output portal, based on said cycle identification information which said cycle identification information generating circuit provided in a portal operating as said input portal generates; and
said second reference cycle identification information generating circuit generates said output side reference cycle identification information based on said cycle identification information which said cycle identification information generating section provided in a portal to which said second reference cycle identification information generating circuit belongs generates.

15. The bridge according to claim 14, wherein each of said portals further comprises a packet reception cycle identification information attaching circuit for generating said cycle identification information at the point in time where said isochronous packet is received from said input side bus, as packet reception cycle identification information, and attaching said packet reception cycle identification information to said isochronous packet; and said delay information generating circuit generates said delay information based on said input side reference cycle identification information, said output side reference cycle identification information, said cycle identification information, and said packet reception cycle identification information which is generated by said packet reception cycle information attaching circuit provided in a portal for operating as said input portal.

16. The bridge according to claim 14, wherein said delay information generating circuit generates said delay information based on said input side reference cycle identification information, said output side reference cycle identification information, and said cycle identification information which said cycle identification information generating circuits respectively provided in a portal belonging to itself and a portal for operating as said input portal generate; and an inter-portal transfer delay from when the portal operating as said input portal outputs said isochronous packet until said isochronous packet is input to the portal operating as said output portal, is shorter than a predetermined time gap for separating a transfer period of said isochronous packet in said input side bus from a transfer period of a packet other than said isochronous packet.

17. The bridge according to claim 14, wherein each of said portals are further provided with a first and second time stamp conversion circuit for converting a value of a time stamp attached to real time data transferred by said isochronous packet data for expressing decoding timing of said real time data;

wherein each of said portals operates as said input portals and a cycle count, which is one of the time information held by said portal and which changes for each of said cycles, is taken as from "0" to "N−1", N being an integer of two or more, said first time stamp conversion circuit subtracts a value of said cycle count from a value of a time stamp included in an isochronous packet received from said input side bus, calculates a first sum of "N" and a difference obtained from the subtraction, calculates a first remainder by dividing the first sum obtained from the addition by "N", and updates the value of the time stamp with the first remainder and when each of said portals operates as said output portals, said second time stamp conversion circuit calculates a second sum of a cycle count for time information held by said portal, said delay information, and a value of a time stamp contained in said isochronous packet output from said switch circuit, calculates a second remainder by dividing the second sum by "N", and updates the value of the time stamp with the second remainder.

18. The bridge according to claim 17, wherein said time stamp stores a value corresponding to a lower order P bit (where P is a natural number) of said cycle count, and a cycle offset showing an offset inside each cycle of said time information.

19. The bridge according to claim 14, wherein said portals are two portals;

said switch circuit is provided with two input ports and two output ports;

and the ports respectively connected to said input ports and said output ports are made different from each other, and perform fixed packet exchange between said two portals.

20. The bridge according to claim 13, wherein said bridge is a IEEE 1394 bridge for performing inter-bus transfer of isochronous packets with a bus conforming to IEEE 1394 standard as the target.

21. The bridge according to any one of claims 13 through 18, wherein respective circuits of the bridge are incorporated into a packet transfer control LSI.

22. The bridge according to claim 21, wherein a plurality of groups of respective circuits provided in a packet transfer control LSI are integrated on one chip.

23. The bridge according to claim 22, wherein said switch circuit is further integrated on said chip.

24. The bridge according to claim 21, wherein said packet transfer control LSI is an IEEE 1394 link layer LSI for inter-bus transferring said isochronous packet with a bus conforming to IEEE 1394 standard as the target.

25. An isochronous packet transfer method for transferring an isochronous packet between an input bus and an output bus, said method comprising:

generating input side cycle identification information which changes in response to a cycle start packet on said input side bus;

generating output side cycle identification information which changes in response to a cycle start packet on said output side bus;

determining an input bus elapsed cycle number based on said input bus cycle identification information and a common reference timing;

determining an output bus elapsed cycle number based on said output bus cycle identification information and said common reference timing;

computing a cycle delay based on said input bus elapsed cycle number and said output bus elapsed cycle number; and transmitting said isochronous packet from said input side bus to said output side bus after a cycle number specified by said cycle delay has elapsed on said output side bus.

26. An isochronous packet transfer method for transferring an isochronous packet between an input bus and an output bus, comprising:

generating input side cycle identification information which changes in response to a cycle start packet on said input side bus;

generating output side cycle identification information which changes in response to a cycle start packet on said output side bus;

generating input side reference cycle identification information based on said input side cycle identification information and a common reference timing;

generating output side reference cycle identification information based on said output side cycle identification information and said common reference timing;

computing a first value based on the input side reference cycle identification information and when said isochronous packet appears on said input side bus;

computing a second value based on the output side reference cycle identification information and when said isochronous packet is to be transmitted on said output side bus;

generating delay information based on said first value and said second value; and transmitting said isochronous packet from said input side bus to said output side bus in response to said delay information.

* * * * *